(12) United States Patent
Standke et al.

(10) Patent No.: US 9,273,186 B2
(45) Date of Patent: *Mar. 1, 2016

(54) COMPOSITION OF OLEFINICALLY FUNCTIONALISED SILOXANE OLIGOMERS BASED ON ALKOXY SILANES

(71) Applicant: Evonik Degussa GmbH, Essen (DE)

(72) Inventors: Burkhard Standke, Loerrach (DE); Ioana-Elena Mihailescu, Rheinfelden (DE); Jaroslaw Monkiewicz, Rheinfelden (DE); Sven Roth, Schwoerstadt (DE); Aristidis Ioannidis, Rheinfelden (DE); Kerstin Weissenbach, Gengenbach (DE)

(73) Assignee: Evonik Degussa GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/360,127

(22) PCT Filed: Nov. 19, 2012

(86) PCT No.: PCT/EP2012/072975
§ 371 (c)(1),
(2) Date: May 22, 2014

(87) PCT Pub. No.: WO2013/076036
PCT Pub. Date: May 30, 2013

(65) Prior Publication Data
US 2014/0309447 A1 Oct. 16, 2014

(30) Foreign Application Priority Data
Nov. 22, 2011 (DE) .......................... 10 2011 086 862

(51) Int. Cl.
| | | |
|---|---|---|
| C07F 7/18 | (2006.01) | |
| C08G 77/20 | (2006.01) | |
| C09D 183/04 | (2006.01) | |
| C09J 183/04 | (2006.01) | |
| C08L 83/04 | (2006.01) | |

(52) U.S. Cl.
CPC .............. *C08G 77/20* (2013.01); *C08L 83/04* (2013.01); *C09D 183/04* (2013.01); *C09J 183/04* (2013.01)

(58) Field of Classification Search
USPC ......................................... 556/450, 457, 458
See application file for complete search history.

(56) References Cited

U.S. PATENT DOCUMENTS

| | | |
|---|---|---|
| 5,282,998 A | 2/1994 | Horn et al. |
| 5,885,341 A | 3/1999 | Standke et al. |
| 6,395,856 B1 | 5/2002 | Petty et al. |
| 6,767,982 B2 | 7/2004 | Standke et al. |
| 6,780,955 B2 | 8/2004 | Barfurth et al. |
| 6,864,323 B2 | 3/2005 | Schlosser et al. |
| 7,781,520 B2 | 8/2010 | Standke et al. |
| 8,236,918 B2 | 8/2012 | Mueh et al. |
| 8,431,646 B2 | 4/2013 | Giessler-Blank et al. |
| 8,795,784 B2 | 8/2014 | Standke et al. |
| 2002/0090316 A1 | 7/2002 | Standke et al. |
| 2003/0166817 A1* | 9/2003 | Barfurth et al. ................. 528/10 |
| 2009/0005518 A1 | 1/2009 | Just et al. |
| 2011/0144278 A1 | 6/2011 | Weissenbach et al. |
| 2011/0282024 A1 | 11/2011 | Weissenbach et al. |
| 2013/0253144 A1 | 9/2013 | Weissenbach et al. |

FOREIGN PATENT DOCUMENTS

| | | |
|---|---|---|
| EP | 0 518 057 A1 | 12/1992 |
| EP | 1 205 481 A2 | 5/2002 |
| EP | 1 205 481 A3 | 5/2002 |
| EP | 1 331 238 A2 | 7/2003 |
| EP | 1 331 238 A3 | 7/2003 |
| WO | WO 2013/076032 A1 | 5/2013 |
| WO | WO 2013/076035 A1 | 5/2013 |

OTHER PUBLICATIONS

Agilent; Technical overview; Jun. 10, 2011, pp. 1-4.*
U.S. Appl. No. 14/360,120, filed May 22, 2014, Standke, et al.
U.S. Appl. No. 14/360,114, filed May 22, 2014, Standke, et al.
International Search Report issued Mar. 21, 2013 in PCT/EP2012/072975.

* cited by examiner

*Primary Examiner* — Sudhakar Katakam
*Assistant Examiner* — Pancham Bakshi
(74) *Attorney, Agent, or Firm* — Oblon, McClelland, Maier & Neustadt, L.L.P.

(57) ABSTRACT

The invention relates to a composition containing olefinically functionalized siloxane oligomers which are derived from olefinically functionalized alkoxy silanes and optionally alkoxy silanes functionalized with saturated hydrocarbons and optionally a tetra alkoxysilane, at most comprising an olefinic group on the silicon atom and which has a reduced chloride content and a weight average molecular mass (Mw) of more than 315 g/mol.

34 Claims, No Drawings

COMPOSITION OF OLEFINICALLY FUNCTIONALISED SILOXANE OLIGOMERS BASED ON ALKOXY SILANES

CROSS REFERENCE TO RELATED APPLICATION

This application is a 371 of PCT/EP2012/072975, filed on Nov. 19, 2012, and claims priority to German Patent Application 10 2011 086 862.3, filed on Nov. 22, 2011.

The invention relates to a composition comprising olefinically functionalized siloxane oligomers which are derived from olefinically functionalized alkoxysilanes and optionally alkoxysilanes functionalized with saturated hydrocarbons, and also, optionally, from a tetraalkoxysilane, which have not more than one olefinic radical on the silicon atom, and also having a reduced total chloride and a weight-average molecular weight (Mw) of greater than 315 g/mol.

It is long-established practice to use mixtures of catenary and cyclic siloxane oligomers in the production of thermoplastics and of elastomers. Increasingly now, however, efforts are made to work in as low-VOC a way as possible, for example in the crosslinking of thermoplastics and also of elastomers, particularly in the production of cables (VOC—Volatile Organic Compounds).

It is also established practice to react vinyltriethoxysilane, optionally in mixtures with alkyltriethoxysilanes and/or tetraethoxysilane, by acidic HCl catalysed hydrolysis and condensation in an alcohol, in the presence of a calculated quantity of water. The alcohol is subsequently removed.

The acid used remains in the product or, in the case of hydrogen chloride (HCl), must be removed again from the crude products after the reaction of the organofunctional alkoxysilanes, in a costly and inconvenient procedure, so as not to contribute to corrosion of the metallic surfaces of the processing machinery. This is done by distillation of the crude siloxane products.

In the application, such as in the production of filled cable compounds, for example, the oligomers are generally employed together with polymers and functional fillers in compounding machines. In the case of batch processes, this takes place in internal mixers or on mixing rolls, and, in the case of continuous compounding operations, it takes place in twin-screw extruders or co-kneaders. The typical processing temperatures here are in the 130-270° C. range; accordingly, at the points where the silane compound is added—depending on the process, this is the inlet of the compounding machine or the polymer melt—as an inevitable result of the process, temperatures prevail which are above the boiling temperature of the silane monomers and distillable oligomers. Experience teaches that in addition to the unwanted loss of active substance, there is also increased incidence of deposition of free silane compounds on the internal housing walls or on the devolatilizing zones. These deposits are based on products of degradation of the vaporized silanes or distillable oligomers. Critical situations may arise as a result of these possibly alcohol-containing vapours, which in the case of backwards devolatilizing may enter the intake area and may come into contact with hot surfaces. This challenge also applies in part-filled zones of the compounding assemblies, or in their devolatilizing zones. Overall, for these reasons, the compounds used must have a very high flash point. Account must also be taken of the liberated hydrolysis alcohol, which is produced, in the case of filled polymer compounds, during the hydrolysis reaction of the ester groups of the silicon-functional group of the silane or silane oligomer in the compound. Overall, therefore, reducing the VOC (volatile organic compounds) is a very important criterion with this technology.

As already mentioned, the customary operating temperatures for the compounding operation are usually above 101° C., and kneading, for example, takes place frequently at 170 to 180° C. Consequently there continues to be a requirement for reduced-VOC and low-corrosion oligomers which as far as possible no longer contain any acidic compounds, such as formic acid, HCl or Cl-containing compounds. Even minuscule amounts of these compounds lead to corrosion at the stated operating temperatures, and hence to wear of the machine components after brief downtime periods. For stainless steels, nickel-based alloys and copper-based alloys, for instance, it is said that they are not resistant, owing to the corrosion that occurs, with respect to formic acid or HCl (see, for example, Handbuch der Metallbeläge, Witzemann, January 2010, Section 7.2 Corrosion Resistance, pp. 200-238). In a brochure (Chemische Beständigkeit der Nirosta®-Stähle, ThyssenKrupp Nirosta GmbH, Edition 3, January 2008), ThyssenKrupp describes various types of corrosion and names typical triggers for erosive surface corrosion in the form of perforation corrosion, gap corrosion or stress crack corrosion, such as the presence of acids and chloride ions. The corrosive effect of acids and chloride ions increases markedly with elevated temperature. The removal of mass from unalloyed steels at high atmospheric humidity (80 to 100% relative humidity) in the presence of formic acid may amount to $10 \, g/m^2$, and in the presence of chlorides may amount to up to $105 \, g/m^2$, after 14 days. Accordingly, the amount of hydrolysis and condensation catalysts in the oligomers prepared in accordance with the invention is as far as possible to be reduced down to a level in the weight ppm to weight ppt range or down to the detection limit.

As well as the corrosion during processing, however, an important part is also played by the presence of chloride/chloride ions or acids in the end application, e.g. in cable insulation systems. As well as the possible corrosion on the insulated current conductor, and the possible negative effect on the electrical properties of the cable insulation itself, it is absolutely necessary to avoid corrosive and halogen-containing combustion gases in the case of halogen-free compounds containing flame retardants. This requirement applies, of course, to all raw materials employed in these compounds.

Through the aforesaid avoidance or minimization of the chloride fractions and acid fractions in the siloxane oligomers of the invention, it would be possible to meet these challenges in full.

Moreover, increasing interest is being focused on silane systems which contain increasingly less organic solvent and therefore are more eco-friendly. For this reason, the trend is toward providing precondensed, lower-VOC silane systems, which then, however, must be stabilized, since they still contain the catalyst, or from which the catalyst must be removed, in a costly and inconvenient procedure.

EP 0 518 057 B1 and U.S. Pat. No. 5,282,998 disclose a process for preparing mixtures of catenary and cyclic siloxane oligomers. According to Examples 1 and 6, the respective product mixtures are prepared by hydrolysis and condensation of vinyltrialkoxysilanes, or of a mixture of vinyl- and alkyltrialkoxysilanes, the hydrolysis and condensation being carried out using 0.63 mol of water per mole of Si in the silane employed.

Furthermore, the method disclosed therein is unable completely to remove the HCl catalyst, and a corrosive residual amount of about 50 to about 230 ppm of HCl remains even in products which are distilled according to the process disclosed. A product according to EP 0 518 057 B1 is subjected to exacting distillation even as part of the work-up procedure, under vacuum, in a costly and energy-intensive way. Said oligomer mixtures find application as crosslinking agents for thermoplastic polyolefins by graft polymerization and hydrolytic condensation.

U.S. Pat. No. 6,395,856 B1 discloses the hydrosilylation of oligomers containing organofunctional silicon, such as the hydrosilylation of vinylmethoxysiliconates from the reaction of vinyltrimethoxysilane in the presence of formic acid, under inert gas, without presence of a diluent.

CN 100343311 C describes silane oligomers obtained by catalytic hydrolysis and condensation of vinyltrimethoxysilane. The use of metal salt catalysts, such as copper hydroxide, for example, in combination with acids is mandatory. The removal of the catalysts is costly and inconvenient and it is likely that catalyst residues and/or neutralization products remain in the product and have deleterious effects in numerous applications. Disclosed here, for instance, is the removal of the acid by a calcium carbonate neutralization, and filtration of the resultant calcium salt.

In the prior art, for a number of siloxane oligomers, the flash point drops within a few days in the course of storage to below 50° C., owing to possibly excessive concentrations of catalyst residues in the composition. Other compositions from the prior art, in turn, exhibit excessive mass losses of up to 25 wt % at 150° C., and a large mass loss of around 50 to 90 wt % at 200° C.

Siloxanes with high molecular weights in the 10 000 g/mol region are described in JP10 298289 A, these siloxanes being prepared by hydrolysis and precondensation or condensation of a vinyl- or phenyl-functional alkoxysilane in the presence of an acid catalyst, the catalyst being subsequently removed from the product mixture by means of an anhydrous, anionic ion exchanger. In the majority of applications, material of such high molecular weight cannot be used, owing to high viscosities and inadequate reactivity.

Organosiloxane oligomers having a multiplicity of possible functionalities, an average molecular weight in the range of Mn=350-2500 g/mol, and a polydispersity (D=Mw/Mn) of 1.0-1.3 are described in JP2004 099872. The preparation takes place in the presence of a basic catalyst, from a very diluted aqueous solution, with a very low, economically undesirable space-time yield; in this way, 1 l of solution yielded 1 ml of isolated product. The teaching of JP2004 099872A could not be reproduced in the manner disclosed. For instance, a number of times, Example 1 could not be reproduced in the manner indicated.

The object of the present invention was to provide more cost-effective and more stable olefinically functionalized siloxane oligomers, which are to be low in chlorine, preferably chlorine-free, and are also to have a sufficient reactivity to be used as drying agents in sealants, while at the same time having a high temperature stability. Moreover, the siloxane oligomers ought to have very high flash points, or to be validly low-VOC even at high temperatures, and ought to be able to be used in the practical art at elevated temperatures without further safety measures. Furthermore, their viscosity is also to be suitable for the applications. A further object was to provide an economic process for preparing these olefinically functionalized siloxane oligomers, allowing the siloxanes to be prepared with less energy consumption while having the desired profile of properties. Likewise an object of the invention was the provision of mixtures, with low chlorine content and amenable to particularly cost-effective preparation, of purely olefinic siloxane oligomers, with the aforementioned profile of properties, based more particularly on alkenylalkoxysilanes, or of mixtures of olefinically functionalized and alkyl-functionalized siloxane oligomers, based more particularly on alkenyl-/alkyl-alkoxysilanes, and also a process for preparing such mixtures. The siloxane oligomers, as well, are to exhibit only small losses in mass even at high temperatures, such as in extruders, for example. Preferably, moreover, the further properties in the practical art, in comparison to known systems, are to be retained or enhanced. A further object, by means of the siloxane oligomers of the invention, was to improve the processability with thermoplastics or elastomers and also to improve the performance of the thermoplastics or elastomers produced using them. A key point with regard to processability is also the rapid dispersibility of the siloxane oligomers in the thermoplastics, in combination with extremely low losses of mass at the prevailing temperatures in extruder applications. It is advantageous here if the residual level of acidic catalyst, more particularly the chlorine content, preferably the total chloride content, and/or else the hydrolysable chloride content, can also be further lowered significantly in accordance with the process. As further objects, the olefinic siloxane oligomers ought to have a good shelf life even over prolonged storage periods, any increase in the flash point ought to be minimized, and also, preferably, any increase in the viscosity, as a result, for example, of gelling or flocculation through post-condensation of the mixture over a prolonged time period, ought to be avoided. Furthermore, the amount of monomers in the olefinically functionalized siloxane oligomers ought to be low, or there ought preferably to be no longer any monomers present that may lead to unwanted post-crosslinking, and at the same time the process ought to be more economical than its known counterparts. The object, furthermore, was at the same time to set a defined degree of oligomerization for the siloxanes, coupled with a dynamic viscosity of ≤3000 mPa s, preferably less than or equal to 1000 mPa s, more particularly less than or equal to 100 mPa s and greater than or equal to 2 mPa s, in order to ensure good processability for the siloxanes. The dynamic viscosity values stated in the context of the invention in the present specification originate from measurements in accordance with DIN 53015.

The objects are achieved in accordance with the independent claims; preferred embodiments are set out in the dependent claims and in the description in detail.

Surprisingly it has been found that olefinically functionalized alkoxysilanes and optionally alkylalkoxysilane can be reacted in a simple and economical way by reaction with a defined molar amount of water, in a ratio of water to alkoxysilane alkoxy groups of 1:2 to 1:6, more particularly of 1:2.75 to 1:5.0, in the presence of a solvent, preferably alcohol, and of an acidic catalyst, but without use of metal salt catalysts, to give the desired low-chlorine compositions, with the hydrolysis alcohol and any solvent present being substantially separated off; more particularly, the solvent and/or the hydrolysis alcohol are/is removed by distillation. In accordance with the invention, acidic catalysts which are gaseous under standard conditions, more particularly HCl, are used as hydrolysis and/or condensation catalyst, and may be dissolved in aqueous or alcoholic phase. A reaction therefore takes place under the conditions of homogeneous catalysis. A surprising advantage was that as a result of the process of the invention, the gaseous catalyst can be removed virtually entirely from the compositions.

It was surprising that in this way it was possible to prepare readily manageable products having a molecular weight $(M_w)$>315 g/mol and <10 000 g/mol, preferably 320 g/mol to 9000 g/mol, more preferably 330 g/mol to 5000 g/mol, very preferably 340 g/mol to 1000 g/mol, more particularly 350 to 850 g/mol, preferentially 350 g/mol to 800 g/mol—mention may further be made of 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700 and 750 g/mol—with a good space-time yield. Preferred weight averages are greater than or equal to 350 to 750 g/mol, preferably 350 g/mol to 725 g/mol, more preferably 410 to 600 g/mol, also preferably 410 to 590 g/mol, or else 410 g/mol to 570 g/mol.

It was surprising, furthermore, that the siloxane oligomers obtained in this way already, as a liquid-phase product, exhibit a very low total chloride content. In accordance with the invention, the resulting compositions have a particularly low chloride content and total chloride content, and have the desired profile of properties, since advantageously they exhibit a low level of M structures of below 80%, more particularly below 75%, preferably less than or equal to 70%, and have a certain minimum weight-average molecular weight (Mw) of greater than 315 g/mol. It was also surprising that the viscosity is suitable for the intended uses in spite of the molecular weight. Accordingly, the present siloxane oligomer compositions are also advantageously low in VOC.

In contrast to the known oligomers, the compositions of the invention and the siloxane oligomer compositions prepared by the process of the invention do not require any further working up, such as a concluding distillation of the siloxane oligomer compositions, for example. The composition prepared, the liquid-phase siloxane oligomer product, shows performance which is equal to or better than that of known siloxane oligomers which, however, have been purified by distillation, and obtained by a somewhat different process. In accordance with the invention, therefore, the resulting siloxane oligomer need no longer be itself distilled, but can instead be obtained and used purely as the liquid-phase product. The composition, therefore, can also be obtained with a greater yield, with a reduced energy requirement.

The invention accordingly provides a composition comprising olefinically functionalized siloxane oligomers having not more than one olefinic radical on the silicon atom, and the olefinically functionalized siloxane oligomers have Si—O-crosslinked structural elements which form catenary, cyclic, crosslinked and/or optionally three-dimensionally crosslinked structures, with at least one structure corresponding in idealized form to the general formula I,

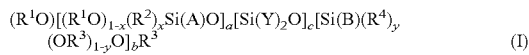

$(R^1O)[(R^1O)_{1-x}(R^2)_xSi(A)O]_a[Si(Y)_2O]_c[Si(B)(R^4)_y(OR^3)_{1-y}O]_bR^3$  (I)

the structural elements being derived from alkoxysilanes and

A in the structural element corresponding to an olefinic radical selected in particular from a linear, branched or cyclic alkenyl- or cycloalkenyl-alkylene-functional group having in each case 2 to 16 C atoms, and B in the structural element corresponding to a saturated hydrocarbon radical selected in particular from a linear, branched or cyclic alkyl radical having 1 to 16 C atoms, Y corresponds to $OR^3$ or, in crosslinked and optionally three-dimensionally crosslinked structures, independently at each occurrence, to $OR^3$ or $O_{1/2}$, Y preferably being $OR^3$, where $R^1$ independently at each occurrence corresponds to a linear, branched and/or cyclic alkyl radical having 1 to 4 C atoms, or optionally to H, $R^3$ independently at each occurrence corresponds to a linear, branched or cyclic alkyl radical having 1 to 4 C atoms or optionally to H, $R^2$ independently at each occurrence corresponds to a linear, branched or cyclic alkyl radical having 1 to 15 C atoms, and $R^4$ independently at each occurrence corresponds to a linear, branched or cyclic alkyl radical having 1 to 15 C atoms, a, b, c, x and y independently correspond to integers, with $1 \leq a$, $0 \leq b$, $0 \leq c$, x independently at each occurrence is 0 or 1, y independently at each occurrence is 0 or 1, and $(a+b+c) \geq 2$, more preferably with x being 0 for $1 \leq a$ or x being 0 for $1 \leq a$ and y being 0 for $1 \leq b$, where the structural elements $[(R^1O)_{1-x}(R^2)_xSi(A)O]_a$, $[Si(B)(R^4)_y(OR^3)_{1-y}O]_b$ and/or $[Si(Y)_2O]_c$ in the general formula I together, in relation to all silicon atoms of the general formula I, are present at or at less than or equal to 80% to greater than or equal to 30%, more particularly greater than or equal to 35%, as M structures, the weight-average molecular weight (Mw) is greater than 315 g/mol, and in particular the amount of residue or residues of the acid catalyst used during preparation, more particularly chlorine or chloride, preferably total chloride, is less than or equal to 250 mg/kg, more particularly less than or equal to 150 mg/kg, preferably less than or equal to 100 mg/kg, more preferably less than or equal to 75 mg/kg, with further preference less than or equal to 50 mg/kg, down to the current analytical detection limit, especially preferably less than or equal to 35 mg/kg, more particularly in the composition as obtained, in accordance with the invention and advantageously, as liquid-phase product, down to preferably less than or equal to 0.001 mg/kg.

In process terms, it has been possible to develop a very economical process, which can be carried out virtually as a one-pot reaction. There is no need for costly and inconvenient distillation of the liquid-phase product. As a result it has been possible to achieve a significant increase in the yield of the products, relative to the known processes. Surprisingly it has been possible to obtain compositions that are of high purity as a result of the process, with very low levels of catalyst or catalyst residues, total chloride, and low fractions of high molecular weight siloxanes.

The defined setting of the molecular weight distribution of the composition of the invention also leads to siloxane oligomers with particular thermal stability, and this, in the subsequent practical application in heated extruders, leads to significantly lower mass losses, even at high temperatures of 150 to 200° C. It is not enough here to simply prepare compounds with a relatively high molecular weight, since oligomeric compounds whose molecular masses are too high lead to interentanglement of the oligomers and hence to a poor or retarded dispersibility in other products, such as the polymer melts in extruders, for example.

Compositions comprise siloxane oligomers without Q structure are also preferred in accordance with the invention, since the Q structures significantly increase the viscosity and hence restrict the spectrum of application. Preferably, therefore, c is 0.

According to another alternative, it is preferred for the composition to comprise olefinically functionalized siloxane oligomers whose weight-average molecular weight (Mw) is greater than or equal to 315 g/mol and whose number-average molecular weight (Mn) is greater than or equal to 300 g/mol, the polydispersity, as the ratio of Mw/Mn being 1.05 to 1.35, the limiting values being included in each case, preferably 1.05 to 1.25, more preferably 1.05 to 1.20, very preferably 1.05 to 1.18 or 1.05 to 1.17. In the compositions, therefore, the siloxane oligomers of the invention exhibit a narrow molar mass distribution, and so a small number of molar mass fractions is obtained in conjunction with a high number of chains per fraction. This narrow molar mass distribution in the compositions may be obtained even in the form of the liquid-phase product, surprisingly, in accordance with the process of the invention, as a result of the controlled process conditions. A further advantage of the narrow molar mass distribution is manifested in a very homogeneous thermal behaviour within a narrow temperature range.

The invention preferably provides compositions comprising olefinically functionalized siloxane oligomers, the olefinically functionalized siloxane oligomers being present at greater than or equal to 90% (area %, GPC) in relation to the overall composition, with a molecular weight of less than or equal to 1000 g/mol in the composition, more particularly at greater than or equal to 92% (area %, GPC), preferably at greater than or equal to 93%. At the same time, preferably, the polydispersity (Mw/Mn) of the siloxane oligomers lies between D=1.05 to 1.25.

It is preferred, moreover, if at the same time greater than 80% (area %, GPC), more particularly greater than 85% of the overall composition has a molecular weight of greater than or equal to 250 g/mol; preferably greater than or equal to 85%, more particularly greater than or equal to 90%, has an Mw of greater than or equal to 250 g/mol. Compositions of the invention therefore advantageously have an Mw of greater than or equal to 250 to less than or equal to 1000 g/mol for greater than or equal to 80%, more particularly greater than or equal to 85% (area %, GPC), preferably greater than or equal to 90%, more preferably greater than or equal to 92%, 93%, 94%, 95% of the siloxane oligomers in the composition, the fluctuation range being able to be plus/minus 5%, preferably plus/minus 2%, more preferably less than or equal to 1%. Compositions of this kind are obtainable by the process of the invention, in particular without focusing on specific chloride contents or total chloride contents. In particular, linear and branched hexasiloxanes, cycloheptasiloxanes and relatively high molecular weight siloxane oligomers are present only at up to 25 area % in the composition, more particularly between 0 to 25 area %, preferably between 10 to 25 area %, more preferably between 11 to 20 area %.

Additionally or independently, greater than or equal to 80%, more particularly greater than or equal to 85% (area %) of the siloxane oligomers, more particularly of the formula I, with (a+b+c)≥2 is present, preferably in combination with 90%, in relation to the overall composition, of less than or equal to 1000 g/mol.

Likewise provided by the invention are compositions comprising olefinically functionalized siloxane oligomers which are present to an extent of greater than or equal to 45% (area %, determined via a GPC analysis) as trisiloxane, tetrasiloxane, cyclotetrasiloxane and/or cyclopentasiloxane in the composition, more particularly at greater than or equal to 47.5%, the polydispersity lying preferably between 1.05 and 1.25, more preferably between 1.05 to 1.20, very preferably 1.05 to 1.17 (including the limiting values). Particularly preferred compositions comprising olefinically functionalized siloxane oligomers which are present to an extent of greater than or equal to 75% (area %, determined via GPC) as disiloxane, trisiloxane, tetrasiloxane, pentasiloxane, cyclotrisiloxane, cyclotetrasiloxane, cyclopentasiloxane and/or cyclohexasiloxane in the composition; preferably greater than or equal to 77.5% (area %, GPC), more preferably greater than or equal to 80% of the oligomers are present with these structures, the polydispersity more particularly being between 1.05 and 1.25, preferably between 1.05 to 1.20, more preferably 1.05 to 1.17 (including the limiting values). It is generally the case that the designation disiloxane, trisiloxane, tetrasiloxane, pentasiloxane covers the siloxanes that are linear and/or branched in each case, and cyclotrisiloxane, cyclotetrasiloxane, cyclopenta- or cycloheptasiloxane covers the cyclic siloxanes.

By virtue of the higher molecular weights in conjunction with low molar mass distribution and high purity, achieved in accordance with the process of the invention, for the compositions comprising olefinically functionalized oligomers, it is possible to set high flash point and at the same time good properties at elevated temperatures. Accordingly, the compositions of the invention each independently have a flash point at a temperature greater than or equal to 85° C., more particularly at greater than or equal to 90° C. A mass loss by the composition of 50 wt %, determined by means of TGA, is preferably displayed by the compositions of the invention only at a temperature above 210° C.; more particularly, a 50% mass loss is only observed above 220° C. (TGA, for measurement see working examples), and with particular preference a 50% mass loss occurs within a very narrow temperature range of around 220 to 250° C., in particular for the differently substituted siloxane oligomers as well, where the range of fluctuation may lie at plus/minus 5° C. (heating rate 10 K/min, platinum crucible, lid with hole).

In line with a further embodiment of the invention, the loss of mass by the composition, as determined by TGA (platinum crucible, lid with hole, 10 K/min), at a temperature up to and including 140° C. is less than 5 wt %. Alternatively or additionally, the mass loss of the composition at a temperature of up to 220° C. is below 50 wt %.

Furthermore, at 200° C., the compositions of the invention exhibit only a mass loss of less than 30 wt %, with the flash point preferably being above 90° C. At temperatures of 150° C., the mass loss of the compositions of the invention is below 10 wt %, more particularly below 8 wt %. The processing temperatures of polymers to which the siloxane oligomers are added for the purpose of adjusting the properties are situated typically at temperatures between 150 to 200° C. Within this range, the compositions of the invention exhibit particularly low mass losses in comparison to known siloxane oligomers from the prior art. Particularly noteworthy is the simultaneously high flash point of the composition of more than 90° C., preferably greater than or equal to 95° C., more preferably greater than or equal to 100° C. Owing to the high purity of the liquid-phase products, these high flash points can also be ensured over a long period of storage, since there are virtually no residues of catalyst remaining in the composition.

Additionally preferred are compositions having olefinically functionalized siloxane oligomers in which the weight-average molecular weight (Mw) is greater than or equal to 420 g/mol and the number-average molecular weight (Mn) is greater than or equal to 400 g/mol, with the polydispersity, as the ratio of Mw/Mn, being 1.05 to 1.35, preferably from 1.05 to 1.25, more preferably from 1.05 to 1.20, more particularly from 1.05 to 1.17. Likewise preferred compositions comprise siloxane oligomers whose weight-average molecular weights (Mw) are greater than 420 g/mol and whose number-average molecular weights (Mn) are greater than or equal to 462 g/mol, with the polydispersity (D), as the ratio of Mw/Mn, being 1.10 to 1.20, more preferably 1.05 to 1.18, or, preferably, the aforementioned values.

According to one further preferred embodiment, the siloxane oligomers in the compositions have a weight-average molecular weight (Mw) of greater than or equal to 450 g/mol to 590 g/mol and a number-average molecular weight (Mn) of greater than or equal to 410 g/mol to 510 g/mol, with the polydispersity (D), as the ratio of Mw/Mn, being 1.05 to 1.25, more particularly 1.05 to 1.22, preferably 1.05 to 1.20.

Weight-Average Molecular Weight (Mw)

$$M_w = \frac{\sum n_i M_i^2}{\sum n_i M_i}$$

and number-average molecular weight (Mn)

$$M_n = \frac{\sum n_i M_i}{\sum n_i}$$

in each case with $n_i$=amount of substance [mass] of the i mer, $M_i$=molar mass of the i mer. Details relating to the definition of weight average and number average, which are known per se to the skilled person, may also be found by the reader, alternatively, from sources including the Internet at http://de.wikipedia.org/wiki/Molmassenverteilung, or from a standard work of mathematics.

In order to ensure a defined profile of properties in terms of low mass loss at high temperatures, more particularly between 150 to 200° C. or else between 200 and 230° C., and also good and rapid dispersibility in polymers, prepolymers or mixtures thereof with monomers, such as in the case of use in extruders, for example, it is vital that the compositions comprise olefinic siloxane oligomers with a defined molar mass distribution, preferably relatively narrow molar mass distributions. Too high a level of high molecular mass products such as linear or branched hexa- or heptasiloxane would hinder dispersibility in the polymers and also adversely affect the crosslinking properties. Moreover, too high a fraction of disiloxanes is also undesirable, since they lead to high mass losses at temperatures between 150 to 200° C.

With particular preference 70% or more of the siloxane oligomers in the composition are present in the form of disiloxane, cyclotrisiloxane, trisiloxane, cyclotetrasiloxane, tetrasiloxane, cyclopentasiloxane, pentasiloxane and/or cyclohexasiloxane, preferably 75% or more, more preferably 80% or more, with further preference 85% or more. Compositions of the invention therefore preferably comprise olefinic siloxane oligomers in accordance with the following proportions, which in each case independently may have a standard deviation of plus/minus 3%: with preference, in each case independently, the amount of monomeric silanes is less than 0.5%, the fraction of disiloxanes and cyclotrisiloxanes is preferably less than or equal to 30%, more preferably less than 25%, the fraction of trisiloxanes and cyclotetrasiloxanes is greater than or equal to 20%, preferably greater than or equal to 23%, the fraction of tetrasiloxanes and cyclopentasiloxanes is greater than or equal to 10%, more particularly greater than or equal to 14%, the fraction of pentasiloxanes and cyclohexasiloxanes is greater than or equal to 6% to 40%, preferably 7% to 30%, and in particular the fraction of linear or branched hexasiloxanes, cycloheptasiloxanes and higher-molecular-mass siloxanes is less than or equal to ≤30%, more particularly ≤25%, preferably less than or equal to 20% (area %), in each case in relation to the overall composition (at 100%). At the same time it is particularly preferred for the mass loss by TGA to be below 50 wt % at temperatures of up to 210° C., preferably below 220° C. It is further preferred for the composition also to have a flash point of greater than or equal to 90° C. The fractions in % are determined in each case as area percent from GPC analyses.

The invention likewise provides a composition comprising olefinically functionalized siloxane oligomers having not more than one olefinic radical on the silicon atom, and the olefinically functionalized siloxane oligomers have Si—O-crosslinked structural elements which form catenary, cyclic, crosslinked and/or optionally three-dimensionally crosslinked structures, with at least one structure corresponding in idealized form to the general formula I, where the siloxane oligomers have derived structural elements from at least one of the alkoxysilanes, (i) from olefinically functionalized alkoxysilanes of the general formula II,

A-Si(R²)ₓ(OR¹)₃₋ₓ  (II)

where A is an olefinic radical selected more particularly from a linear, branched or cyclic alkenyl- or cycloalkenyl-alkylene-functional group having in each case 2 to 16 C atoms, where $R^2$ independently at each occurrence is a linear, branched or cyclic alkyl radical having 1 to 15 C atoms and x is 0 or 1, preferably x is 0, and $R^1$ independently at each occurrence is a methyl, ethyl or propyl group, or, optionally, from a mixture of alkoxysilanes of the formula II, more particularly x is 0, or transesterification products thereof, and optionally (ii) from alkoxysilane of the formula III, functionalized with a saturated hydrocarbon radical,

B—Si(R⁴)ᵧ(OR³)₃₋ᵧ  (III)

where B is an unsubstituted hydrocarbon radical selected from a linear, branched or cyclic alkyl radical having 1 to 16 C atoms, where $R^3$ independently at each occurrence is a methyl, ethyl or propyl group and $R^4$ independently at each occurrence is a linear, branched or cyclic alkyl radical having 1 to 15 C atoms, and y is 0 or 1, y preferably being 0, or, optionally, from a mixture of alkoxysilanes of the formula III or transesterification products thereof, more particularly y=0, and optionally (iii) from a tetraalkoxysilane of the general formula IV which is Si(OR³)₄, where $R^3$ independently at each occurrence is a methyl, ethyl or propyl group, or transesterification products thereof, and in particular the amount of residue or residues of the acid catalyst used during the preparation, more particularly chlorine and/or chloride, preferably total chloride, is less than or equal to 250 mg/kg, more particularly less than or equal to 150 mg/kg, preferably less than or equal to 100 mg/kg, more preferably less than or equal to 75 mg/kg, with further preference less than or equal to 50 mg/kg down to the current analytical detection limit, especially preferably less than or equal to 35 mg/kg, in a composition as obtained in accordance with the invention and advantageously as liquid-phase product; the weight-average molecular weight (Mw) is greater than 315 g/mol; and the structural elements [(R¹O)₁₋ₓ(R²)ₓSi(A)O]ₐ, [Si(B)(R⁴)ᵧ(OR³)₁₋ᵧO]ᵦ and/or [Si(Y)₂O]c, derived through at least partial hydrolysis and condensation from said alkoxysilanes, in the siloxane oligomers, more particularly in the idealized general formula I, are present together, in relation to all silicon atoms of the general formula I, at less than or equal to 80% to greater than or equal to 30%, more particularly greater than or equal to 35%, as M structure.

All alkyl radicals, such as $R^1$, $R^2$, $R^3$ and $R^4$, with 1 to 4 C atoms may in each case independently of one another be preferably methyl, ethyl, propyl, n-propyl, isopropyl, butyl, n-butyl, isobutyl, tert-butyl and/or, with 5 C atoms, 2-methylbutyl. The alkyl radicals $R^2$ and $R^4$ here may be selected, in each case independently, from a methyl, ethyl, propyl, butyl, isobutyl, n-butyl, tert-butyl, pentyl, n-pentyl, isopentyl, neopentyl, hexyl, isohexyl, neohexyl, cyclohexyl, 2,2-dimethylbutyl, 2,3-dimethylbutyl, 2-methylpentyl, 3-methylpentyl, octyl, n-octyl, isooctyl, nonyl, decyl, undecyl, dodecyl, $C_{13}H_{27}$, $C_{14}H_{29}$ and a $C_{15}H_{31}$ group or cyclopentyl, cyclohexyl and also an alkyl-substituted cyclopentyl and cyclohexyl group.

Transesterification products may comprise alkoxysilanes having different alkoxy groups, such as, for example, alkoxysilanes functionalized with methoxy and ethoxy groups and of the formulae II, II, IV or else of the formula I. The siloxane oligomers and the alkoxysilanes of the formulae II, III and IV may be present in the form of transesterification products. Thus, for example, the alkoxysilanes of the formula II may be present in the form of mixtures of methoxysilanes, ethoxysilanes, methoxyethoxysilanes with mixed functionalization. Correspondingly, the alkoxysilanes of the formula III may also be mixtures of methoxysilanes, ethoxysilanes, or methoxyethoxysilanes with mixed functionalization. Corresponding comments apply to the olefinically functionalized siloxane oligomers, more particularly of the formula I; as $R^1$ and $R^3$ they may have methyl or ethyl groups and also both groups, and may be present in the form of methoxy- and ethoxy-functionalized oligomers.

In addition to the aforementioned features, the amount of M structures of the siloxane oligomers in the composition of the invention is significantly reduced relative to the prior art, which discloses a very high fraction of M and D structures, the very much predominant fraction being present as M structure in the siloxane oligomer.

Furthermore, in addition to the aforementioned features, the amount of monomeric alkoxysilanes in the composition of the invention is significantly reduced. The invention therefore also provides a composition comprising olefinically functionalized siloxane oligomers in which the amount of silicon atoms of monomeric alkoxysilanes is less than or equal to 2% down to the detection limit or 0.0% in relation to all silicon atoms, preferably less than 1% to 0.0%, more preferably less than or equal to 0.9% to 0.0%, more preferably still less than or equal to 0.8 to 0.0 wt %. Considered monomeric alkoxysilanes are the alkoxysilanes of the formulae II, III and/or IV and also their monomeric hydrolysis products. The amount in percent may be determined by means of $^{29}Si$ NMR spectroscopy for example. These monomers lead to post-crosslinking in the siloxane oligomers, and impair their profile of properties. On the basis of international stipulations, such as the OECD definition of polymers, and of further specifications, there is an intense need to produce polymers very largely free from monomers.

According to particularly preferred embodiments, the olefinic radical A in formulae I and/or II corresponds to a non-hydrolysable olefinic radical, more particularly to a linear, branched or cyclic alkenyl- or cycloalkenyl-alkylene-functional group having in each case 2 to 16 C atoms, preferably to a vinyl, allyl, butenyl, such as 3-butenyl, pentenyl, hexenyl, ethylhexenyl, heptenyl, octenyl, cyclohexenyl-C1 to C8-alkylene, preferably cyclohexenyl-2-ethylene, such as 3"-cyclohexenyl-2-ethylene and/or cyclohexadienyl-C1 to C8-alkylene, preferably cyclohexadienyl-2-ethylene, group.

Likewise preferably the unsubstituted hydrocarbon radical B, independently in formulae I and/or III, may correspond to a linear, branched or cyclic alkyl radical having 1 to 16 C atoms, more particularly to a methyl, ethyl, propyl, n-propyl, isopropyl, butyl, n-butyl, isobutyl, octyl, n-octyl, isooctyl or hexadecyl group. Likewise preferably the radical B may independently be selected from tert-butyl, pentyl, n-pentyl, isopentyl, neopentyl, hexyl, isohexyl, neohexyl, heptyl, 2,2-dimethylbutyl, 2,3-dimethylbutyl, 2-methylpentyl, 3-methylpentyl, neooctyl, nonyl, decyl, undecyl, dodecyl, 2-methylheptyl, 3-methylheptyl, 4-methylheptyl, 2,2-dimethylhexyl, 2,3-dimethylhexyl, 2,4-dimethylhexyl, 2,5-dimethylhexyl, 3,3-dimethylhexyl, 3,4-dimethylhexyl, 3-ethylhexyl, 2,2,3-trimethylpentyl, 2,2,4-trimethylpentyl, 2,3,3-trimethylpentyl, 2,3,4-trimethylpentyl, 3-ethyl-2-methylpentyl, 3-ethyl-3-methylpentyl, 2,2,3,3-tetramethylbutyl, $C_{13}H_{27}$, $C_{14}H_{29}$ and a $C_{15}H_{31}$ group. According to one alternative, the alkyl radical may be branched or cyclic with 3 to 16 C atoms, or linear with 2 to 7 C atoms.

In accordance with the invention the structural elements $[(R^1O)_{1-x}(R^2)_xSi(A)O]_a$, $[Si(B)(R^4)_y(OR^3)_{1-y}O]_b$ and $[Si(Y)_2O]_c$ in the general formula I are present together, in relation to all silicon atoms of the general formula I, at less than or equal to 8% to 0.0% as T structure, more particularly at less than or equal to 7.8% to 1.00% as T structure, alternatively preferably from 6.0 to 2.0%.

The olefinically functionalized siloxane oligomers likewise preferably have a ratio of silicon atoms to A and B radicals, with the proviso that a is greater than or equal to 1, b is greater than or equal to 0 and c is greater than or equal to 0, and (a+b+c) is greater than or equal to 2, of Si to (A+B radicals) of 1:1 to about 1.22:1, preferably of 1:1 to 1.15:1. According to one particularly preferred alternative, c is 0 and a is an integer greater than or equal to 1, and according to another preferred alternative c is 0 and a is greater than or equal to 1 and b is greater than or equal to 1, integers independently in each case.

Likewise provided by the invention are compositions comprising olefinically functionalized siloxane oligomers which have not more than one olefinic radical on the silicon atom and in which in particular, is selected in each case independently of one another:

(i) the structural element $[(R^1O)_{1-x}(R^2)_xSi(A)O]_a$ in the general formula I is present, in relation to all silicon atoms of the general formula I, at 0.0 to 8.0 as T structure, more particularly from 0.0 to 7.75%, preferably from 1.0% to 7.75%, and/or the structural element $[Si(B)(R^4)_y(OR^3)_{1-y}O]_b$ in the general formula I is present, in relation to all silicon atoms of the general formula I, from 0.0 to 1.5 as T structure, preferably from 0.0 and 1.0%, and optionally (ii) the structural elements $[(R^1O)_{1-x}(R^2)_xSi(A)O]_a$ and $[Si(B)(R^4)_y(OR^3)_{1-y}O]_b$ and $[Si(Y)_2O]_c$ in the general formula I are present together, in relation to all silicon atoms of the general formula I, at less than or equal to 75% to 15% or less than or equal to 75% to 40% as D structure, more particularly at from 70% to 42%, preferably from 65% to 42%, more preferably from 65% to 43%, and optionally (iii) the structural element $[(R^1O)_{1-x}(R^2)_xSi(A)O]_a$ in the general formula I is present, in relation to all silicon atoms of the general formula I, at 25% to 55% as M structure, more particularly from 25% to 50%, more preferably from 29% to 45%, 35% to 45%, and optionally (iv) the structural element $[Si(B)(R^4)_y(OR^3)_{1-y}O]_b$ in the general formula I is present, in relation to all silicon atoms of the general formula I, at less than or equal to 40% as M structure, more particularly at less than or equal to 35%, such as 30% to 40%, and/or optionally (v) the structural element $[Si(Y)_2O]_c$ in the general formula I has greater than or equal to 20% of the structural elements $[Si(Y)_2O]_c$ in the general formula I present as D structure, more particularly between 20% to 40%, and/or optionally (vi) the structural element $[Si(Y)_2O]_c$ in the general formula I is present at 0.0% to 1% as T structure. According to one particularly preferred alternative, in formula I, c is 0.

Likewise provided by the invention are compositions comprising olefinically functionalized siloxane oligomers which have not more than one olefinic radical on the silicon atom and in which, is selected in each case independently of one another: (i) the structural element $[(R^1O)_{1-x}(R^2)_xSi(A)O]_a$ in the general formula I is present, in relation to all silicon atoms of the general formula I, at from 0.0 to 8.0 as T structure, more particularly from 0.0 to 7.75%, preferably from 1.0% to 7.75%, and/or the structural element $[Si(B)(R^4)_y(OR^3)_{1-y}O]_b$ in the general formula I is present, in relation to all silicon atoms of the general formula I, at from 0.0 to 1.5 as T structure, preferably from 0.0 and 1.0%, and (ii) the structural elements $[(R^1O)_{1-x}(R^2)_xSi(A)O]_a$ and $[Si(B)(R^4)_y(OR^3)_{1-y}O]_b$ and $[Si(Y)_2O]_c$ in the general formula I are present together, in relation to all silicon atoms of the general formula I, at less than or equal to 50% to 15% as D structure, more particularly from 50% to 17%, very preferably from 50% to 30%, and optionally (iii) the structural element $[(R^1O)_{1-x}(R^2)_xSi(A)O]_a$ in the general formula I is present, in relation to all silicon atoms of the general formula I, at from 28% to 50% as M structure, and optionally (iv) the structural element $[Si(B)(R^4)_y(OR^3)_{1-y}O]_b$ in the general formula I is present, in relation to all silicon atoms of the general formula I at less than or equal to 40% to 30% as M structure.

Likewise preferably the ratio of M to D structures in the olefinic siloxane oligomers, more particularly of the general formula I, in relation to all silicon atoms is from 1:2 to 10:1, preferably 1:2 to 3:1, more preferably 1:2 to 3:1, further preferably 1:2 to 2.5:1, more preferably 1:1.2 to 3:1, in particular additionally to the amount of T structures of all structural elements in the general formula I from 8.0 to 0.0%, preferably 8.0 to 0.5%. The compositions additionally have high flash points of greater than or equal to 85° C., more particularly greater than or equal to 90° C. The good flash point is attributed to very high purity of the isolated composition and a very low level of catalyst residues or no catalyst residues. Further provided by the invention are compositions in which the olefinically functionalized siloxane oligomers a ratio of M to D structures, or at least one siloxane oligomer of the general formula I, in relation to all silicon atoms, of 1:1.2 to 3:1, and the flash point of the composition is at a temperature greater than or equal to 85° C.

The amount of M, D, T or Q structures is determined in general by a method known per se to the skilled person, preferably by means of $^{29}$Si-NMR.

The definition of M, D, T and Q structures refers generally to the number of oxygens bonded in siloxane bonds, as illustrated below for alkoxysilyl units by way of example: With R independently at each occurrence being $OR^1$, $OR^3$, group A or group B, as defined above. With $M=[-O_{1/2}-Si(R)_3]$, $D=[-O_{1/2}-Si(R)_2-O_{1/2}-]$, $T=[RSi(-O_{1/2}-)_3]$ and $Q=[Si(-O_{1/2}-)_4]$. $-O_{1/2}-$ is always an oxygen in a siloxane bond. Accordingly, in order to be able to describe silicones and siloxanes and/or silane oligomers more illustratively, it is also possible to use the M, D, T (crosslinked) and Q (three-dimensionally crosslinked) structures rather than an idealized description by formula. For the more precise nomenclature of the designation of such siloxane structures, reference may be made to Römpp Chemielexikon—entry heading: Silicones. For example, only dimers can be formed from structural units M, with $M_2$, such as hexaalkoxydisiloxane. The construction of chains requires compositions of structural units D and M, and timers ($M_2D$, octaalkoxytrisiloxane), tetramers ($M_2D_2$) and so on up to linear oligomers with $M_2D_n$ can be constructed. The formation of cyclic oligomers requires structural units D. In this way, for example, rings with $D_3$, $D_4$, $D_5$ or higher can be constructed. Branched and/or crosslinked structural elements, under which spiro compounds should also be reckoned, are obtained when structural units T and/or Q are present together. Conceivable crosslinked structures may be present in the form of $T_n$ (n≥4), $D_nT_m$ (m<n), $D_nT_m$ (n>>m), $D_3T_2$, $M_4Q$, $D_4Q$ and so on, to give just a few conceivable possibilities. Structural units M are also referred to as stoppers or transfer agents, while D units are termed chain formers or ring formers, and the T, and possibly also Q, units are referred to as network formers. Thus the use of tetraalkoxysilanes, because of the four hydrolysable groups, and ingress of water and/or moisture, can bring about structural units Q and hence the formation of a network (three-dimensionally crosslinked). In contrast, fully hydrolysed trialkoxysilanes can give rise to branching, T units [—Si(—O—)$_{3/2}$], in a structural element, as for example $MD_3TM_2$ for an oligomer with a degree of oligomerization of n=7, with the respective functionalities on the free valencies of the silyloxy units to be defined in these structural representations.

Further details on the nomenclature comprehension of M, D, T and Q structures, and also relevant methods of analysis, include the following:

"Strukturuntersuchungen von oligomeren und polymeren Siloxanen durch hochauflösende $^{29}$Si-Kernresonanz" [Structural analyses of oligomeric and polymeric siloxanes by high-resolution $^{29}$Si nuclear magnetic resonance], H. G. Horn, H. Ch. Marsmann, Die Makromolekulare Chemie 162 (1972), 255-267;

"Über die $^1$H-, $^{13}$C- und $^{29}$Si-NMR chemischen Verschiebungen einiger linearer, verzweigter und cyclischer Methyl-Siloxan-Verbindungen" [On the $^1$H, $^{13}$C and 29Si NMR chemical shifts of some linear, branched and cyclic methyl-siloxane compounds], G. Engelhardt, H. Jancke; J. Organometal. Chem. 28 (1971), 293-300;

"Chapter 8—NMR spectroscopy of organosilicon compounds", Elizabeth A. Williams, The Chemistry of Organic Silicon Compounds, 1989 John Wiley & Sons Ltd., 511-533.

Compositions which exhibit the aforementioned structures possess a high flash point and particularly low VOC contents in the context of the subsequent application. One especially noteworthy advantage of the compositions of the invention and of the process of the invention is that the olefinic siloxane oligomers prepared, especially the vinyl oligomers, or else the vinyl-/alkyl-siloxane oligomers, differ from the known oligomers in requiring no further work-up, such as the distillation of the compositions of the siloxane oligomers in EP 0 518 057 B1.

Another particular advantage of the olefinically functionalized siloxane oligomers of the invention is that the defined weight-average molecular weight, preferably with a defined number-average molecular weight, preferably with the ratio of M to D structures according to the invention, directly improves the processing properties of the siloxane oligomers with polymers, such as during kneading or compounding, for example. The improved water uptake capacity is manifested in a reduction in the amount of water absorbed. The volume flow index is improved as well, and so there is a reduced energy consumption for processing. Furthermore, the corrosion of the iron-containing machines goes down, since it has been possible to achieve a further reduction in the chloride content. The reduced water uptake capacity is advantageous in the subsequent application sectors, such as in the production of filled cable compounds, for example, especially for cables which are to be laid in the earth and are subject to persistent moisture. In order to avoiding creeping corrosion of metallic conductors in electrical cables, the very low-chloride or chloride-free compositions of the invention make a contribution.

It may further be preferable for the composition of the invention and/or the siloxane oligomer also to have trialkylsilane groups, such as trimethylsilane or triethylsilane groups, through the addition, for example, of alkoxytrialkylsilane, in order to adjust the degree of oligomerization. For adjusting the degree of oligomerization during the preparation of the composition it may therefore be preferable, for chain termination at a desired point in time, to add an alkoxytrialkylsilane, such as an ethoxytrimethylsilane or methoxytrimethylsilane with preference, to the composition that is to be prepared.

Compositions of the invention may comprise at least 20 wt % of siloxane oligomers, with the degree of oligomerization of the siloxane oligomers, more particularly of the formula I, the sum of (a+b) is an integer greater than or equal to 5, in particular the sum of (a+b) is greater than or equal to 6, advantageously the sum of (a+b) is greater than or equal to 8, with a being greater than or equal to 1 and b being 0 or b being greater than or equal to 1, preferably each of a and b independently of one another being greater than or equal to 2, more particularly independently greater than or equal to 4, and preferably with c being 0 or optionally with c in (a+b+c) being greater than or equal to 1.

Additionally or alternatively to one or more of the aforementioned features, the composition, following complete hydrolysis of all the alkoxy groups, preferably has an alcohol content of below 55 wt %, more particularly below 50 wt %, in the case of methoxysiloxanes preferably below 40 wt %, more preferably below 35 wt %, very preferably below 30 wt %, and greater than or equal to 5 wt %, preferably greater than or equal to 10 wt %, more particularly greater than or equal to 20 wt %, with the proviso that only the amount of water needed for the hydrolysis is added. There is no further dilution for the determination.

A particular advantage of one alternative of the compositions of the invention comprising olefinically functionalized siloxane oligomers is that on hydrolysis they release not more than 55 wt %, based on the overall composition, of hydrolysis alcohol from hydrolysable alkoxy groups; preferably less than 45%, more preferably less than 40% VOC (for determination see description of Methods).

Additionally or alternatively to one or more of the aforementioned features, the composition preferably has a molar ratio of A radicals to B radicals of 1:0 to 1:8, preferably of about 1:0 to 1:4, more preferably a ratio of 1:0 to 1:2, preferably 1:0 to 1:1, more preferably of 1:1.

It is further preferred here for the composition to comprise olefinic siloxane oligomers in which the ratio of the silicon atoms, selected from olefinically functionalized silicon atoms and from silicon atoms functionalized with a saturated hydrocarbon, to alkoxy groups in the siloxane oligomer, or alternatively in the general formula I, is from 1:0.3 to 1:2.5, preferably 1:1.0 to 1:2.0, likewise preferred, however, are also 1:1.3 to 1:1.9, particularly preferred are 1:1.3 to 1:1.6, with the proviso that the olefinically functionalized siloxane oligomer is derived from alkoxysilanes of the general formula II or of the formulae II and III.

According to one alternative, compositions of purely olefinically substituted siloxane oligomers are prepared, especially of the formula I with a being an integer greater than or equal to 2 and with b being 0 and c being 0, more particularly with a weight-average molecular weight (Mw) of greater than 315 g/mol, more particularly up to 800 g/mol, preferably up to 750 g/mol. Usefully at least 20 wt % of the siloxane oligomers are present with a being greater than or equal to 4, optionally greater than or equal to 8. Preferred olefinic groups are linear, branched or cyclic, alkenyl-, cycloalkenyl-alkylene-functional groups having in each case 2 to 16 C atoms, preferably a vinyl, allyl, butenyl, such as 3-butenyl, pentenyl, hexenyl, ethylhexenyl, heptenyl, octenyl, cyclohexenyl-C1 to C8-alkylene, preferably cyclohexenyl-2-ethylene, such as 3"-cyclohexenyl-2-ethylene and/or cyclohexadienyl-C1 to C8-alkylene, preferably cyclohexadienyl-2-ethylene group. The composition may optionally be based on a siloxane oligomer which has been prepared in the presence of tetraalkoxysilane.

Corresponding to a second preferred alternative, compositions of olefinically substituted and alkyl-substituted siloxane oligomers are prepared, more particularly of the formula I with a being greater than or equal to 1 and b being greater than or equal to 1, more particularly with a weight-average molecular weight (Mw) of greater than 315 g/mol, more particularly up to 800 g/mol, preferably up to 750 g/mol. In particular it is possible for at least 20 wt % of the siloxane oligomers to have, for (a+b), greater than or equal to 4, preferably an integer greater than or equal to 8. In the case of these compositions it is further preferred if the molar ratio of A radicals to B radicals is 1:0 to 1:8, the ratio of a:b being more particularly 1:0 to 1:8, more particularly 1:0 or 1:1 to 1:8. The composition may optionally be based on a siloxane oligomer which has been prepared in the presence of tetraalkoxysilane.

Corresponding to a further preferred alternative, compositions of vinyl- and alkyl-substituted siloxane oligomers are prepared, more particularly of the formula I with a being greater than or equal to 1 and b being greater than or equal to 1, preferably with a weight-average molecular weight (Mw) of greater than 315 g/mol, more particularly up to 800 g/mol, preferably up to 750 g/mol. Furthermore, preferably 20 wt % of the siloxanes have, with (a+b), greater than or equal to 4, preferably an integer greater than or equal to 8, preferably with a molar ratio of A radicals to B radicals of 1:0 to 1:8, more preferably of a:b of 1:0 to 1:8, more particularly 1:0 or 1:1 to 1:8. The compositions may optionally be based on a siloxane oligomer which has been prepared in the presence of tetraalkoxysilane.

With further preference the composition comprises siloxane oligomers having structural elements which are obtainable or derived from at least one of the alkoxysilanes, from olefinically functionalized alkoxysilanes of the general formula II, and optionally from an alkoxysilane of the formula III functionalized with a saturated hydrocarbon radical, and optionally from a tetraalkoxysilane of the general formula IV which is $Si(OR^3)_4$, where the weight-average molecular weight (Mw) is greater than 315 g/mol, more particularly up to 800 g/mol, preferably up to 750 g/mol.

A structural element—a monomeric siloxane unit—is understood consistently to refer to the individual structural unit M, D, T or Q (for the nomenclature of M and D and T and Q structural units, see the observations already made above), i.e., to the structural unit which is derived from an alkoxy-substituted silane and which forms by at least partial hydrolysis to optionally complete hydrolysis and at least partial condensation in a condensate. In accordance with the invention it is possible in particular for the siloxane oligomers with the following structural elements to form, such as, preferably: $(R^1O)[(R^1O)_{1-x}(R^2)_xSi(A)O]_aR^1$; $(R^1O)[(R^1O)_{1-x}(R^2)_xSi(A)O]_a$; $[(R^1O)_{1-x}(R^2)_xSi(A)O]_a$; $[(R^1O)_{1-x}(R^2)_xSi(A)O]_aR^1$; $(R^3O)[Si(Y)_2O]_c$; $[Si(Y)_2O]_cR^3$, $(R^3O)[Si(Y)_2O]_cR^3$; $[Si(Y)_2O]_c$; $(R^3O)[Si(B)(R^4)_y(OR^3)_{1-y}O]_bR^3$; $[Si(B)(R^4)_y(OR^3)_{1-y}O]_bR^3$, $[Si(B)(R^4)_y(OR^3)_{1-y}O]_b$; $(R^3O)[Si(B)(R^4)_y(OR^3)_{1-y}O]_bR^3$, which may form catenary, cyclic and/or crosslinked structures, and in the presence of tetraalkoxysilanes or their hydrolysis and/or condensation products, it is also possible for three-dimensionally crosslinked structures to be formed. The structural elements with free valencies on the Si atom are satisfied covalently via —OSi, and the free valencies on the O atom are satisfied with Si-bridged bonds of other structural elements, alkyl or optionally hydrogen. These structural elements may take up a disordered or else statistical arrangement in the condensates, and this arrangement, as the skilled person is aware, may also be controlled by the sequence of the addition and by the conditions of hydrolysis and/or condensation. The general formula I does not reproduce the composition or structure that it actually present. It corresponds to one idealized possibility of representation.

The composition preferably comprises siloxane oligomers which come about through statistical and/or disordered homo- or co-hydrolysis and/or homo- or co-condensation and/or block condensation of the stated structural elements, based on the alkoxysilanes of the formulae II, III and/or IV, substituted in accordance with the invention by A or B radicals, and/or which form under the experimental conditions selected.

The substitution pattern of the structural elements also applies, correspondingly, for the catenary, cyclic, crosslinked and/or three-dimensionally crosslinked siloxane oligomers in the composition that are not depicted in idealized form, it being possible for the silyl groups of the siloxane oligomers to be substituted, independently, as follows: by Y an $OR^3$ or, in crosslinked and/or three-dimensionally crosslinked structures independently of one another, $OR^3$ or $O_{1/2}$ in a siloxane bond, with radicals A and/or B, as defined; $R^3$ in the siloxane oligomers corresponds essentially to an alkyl radical, as defined for $R^3$, and in crosslinked and/or three-dimensionally crosslinked structures it is also possible, from the radicals $OR^3$, in each case independently of one another, for siloxane bonds with $O_{1/2}$ to be formed, and/or these radicals may be present independently of one another as $O_{1/2}$, and optionally independently with $R^2$ and/or $R^4$, and which, as defined, correspond to an alkyl radical having 1 to 15 C atoms with —$OR^1$, $R^1$ independently an alkyl radical having 1 to 4 C atoms.

Likewise provided by the invention are compositions comprising
a) the siloxane oligomers and at least one structure of the formula I derived in each case from alkoxysilanes of the formula II have a vinyl group as olefinic radical A, with $R^1$ independently at each occurrence corresponding to a methyl or ethyl group, and also, optionally, transesterification products thereof,
b) the siloxane oligomers and at least one structure of the formula I derived in each case from alkoxysilanes of the formula II have a vinyl group as olefinic radical A, and derived from alkoxysilanes of the formula III have a propyl group as unsubstituted hydrocarbon radical B, where $R^1$ and $R^3$ each independently of one another correspond to a methyl or ethyl group, and also, optionally, the transesterification products thereof, or
c) the siloxane oligomers and at least one structure of the formula I, derived in each case from alkoxysilanes of the formula II and formula IV and optionally of the formula III, are selected from a) or b), where $R^3$ is derived from formula IV and in each case independently at each occurrence corresponds to a methyl or ethyl group, and also, optionally, the transesterification products thereof.

Likewise provided by the invention are processes in which, in the olefinically functionalized alkoxysilanes of the general formula II, x is 0, and optionally, in the alkoxysilane of the formula III functionalized with a saturated hydrocarbon radical, y is 0. Alternatively x can be 0 and y can be 1, or x can be 1 and y can be 0.

Compositions that are also preferred comprise, in each case independently, siloxane oligomers, more particularly with structural elements derived from alkoxysilanes, and optionally at least one structure of the formula I from at least one olefinically functionalized alkoxysilane of the general formula II, selected from vinyltriethoxysilane, vinyltrimethoxysilane, and optionally from alkoxysilanes of the formula III, the alkoxysilanes of the formula III being selected independently in each case from methyltriethoxysilane, methyltrimethoxysilane, ethyltriethoxysilane, ethyltrimethoxysilane, propyltriethoxysilane, propyltrimethoxysilane, butyltriethoxysilane, butyltrimethoxysilane, n-butyltriethoxysilane, n-butyltrimethoxysilane, isobutyltriethoxysilane, isobutyltrimethoxysilane, hexyltriethoxysilane, hexyltrimethoxysilane, n-hexyltriethoxysilane, n-hexyltrimethoxysilane, isohexyltriethoxysilane, isohexyltrimethoxysilane, octyltriethoxysilane, octyltrimethoxysilane, n-octyltriethoxysilane, n-octyltrimethoxysilane, isooctyltriethoxysilane, isooctyltrimethoxysilane, undecyltriethoxysilane, undecyltrimethoxysilane, decyltriethoxysilane, decyltrimethoxysilane, nonadecyltriethoxysilane, nonadecyltrimethoxysilane, dodecyltriethoxysilane, dodecyltrimethoxysilane, $C_{13}H_{27}$-triethoxysilane, $C_{13}H_{27}$-trimethoxysilane, $C_{14}H_{29}$-triethoxysilane, $C_{14}H_{29}$-trimethoxysilane, $C_{15}H_{31}$-trimethoxysilane, $C_{15}H_{31}$-triethoxysilane, hexadecyltriethoxysilane and hexadecyltrimethoxysilane, dimethyldimethoxysilane (DMDMO), dimethyldiethoxysilane, propylmethyldimethoxysilane, propylmethyldiethoxysilane, n-octylmethyldimethoxysilane, n-hexylmethyldimethoxysilane, n-hexylmethyldiethoxysilane, propylmethyldiethoxysilane, propylmethyldiethoxysilane, cyclohexyltriethoxysilane, n-propyltri-n-butoxysilane, hexadecylmethyldimethoxysilane and/or hexadecylmethyldiethoxysilane, and also mixtures of these silanes, or a mixture comprising at least two of the silanes, and also the transesterification products thereof.

Further preferred compositions comprise, in each case independently, siloxane oligomers having derived structural elements and optionally at least one structure of the formula I composed of at least one olefinically functionalized alkoxysilane of the general formula II, selected from alkoxysilanes of the formula II having an olefinic radical A selected from at least one allyl, butenyl, 3-butenyl, pentenyl, hexenyl, ethylhexenyl, heptenyl, octenyl, cyclohexenyl-C1 to C8-alkylene, cyclohexenyl-2-ethylene, 3'-cyclohexenyl-2-ethylene, cyclohexadienyl-C1 to C8-alkylene and cyclohexadienyl-2-ethylene group, where $R^1$ independently at each occurrence corresponds to a methyl or ethyl group, or from at least one aforementioned olefinically functionalized alkoxysilane of the formula II, particular preference being given to the combination of a cyclohexenyl-2-ethylene- or cyclohexadienyl-2-ethylene-functionalized alkoxysilane of the formula II with an alkoxysilane of the formula III, where the at least one alkoxysilane of the formula III is selected from methyltriethoxysilane, methyltrimethoxysilane, ethyltriethoxysilane, ethyltrimethoxysilane, propyltriethoxysilane, propyltrimethoxysilane, butyltriethoxysilane, butyltrimethoxysilane, n-butyltriethoxysilane, n-butyltrimethoxysilane, isobutyltriethoxysilane, isobutyltrimethoxysilane, hexyltriethoxysilane, hexyltrimethoxysilane, n-hexyltriethoxysilane, n-hexyltrimethoxysilane, isohexyltriethoxysilane, isohexyltrimethoxysilane, octyltriethoxysilane, octyltrimethoxysilane, n-octyltriethoxysilane, n-octyltrimethoxysilane, isooctyltriethoxysilane, isooctyltrimethoxysilane, undecyltriethoxysilane, undecyltrimethoxysilane, decyltriethoxysilane, decyltrimethoxysilane, nonadecyltriethoxysilane, nonadecyltrimethoxysilane, dodecyltriethoxysilane, dodecyltrimethoxysilane, $C_{13}H_{27}$-triethoxysilane, $C_{13}H_{27}$-trimethoxysilane, $C_{14}H_{29}$-triethoxysilane, $C_{14}H_{29}$-trimethoxysilane, $C_{15}H_{31}$-trimethoxysilane, $C_{15}H_{31}$-triethoxysilane, hexadecyltriethoxysilane and hexadecyltrimethoxysilane and also the transesterification products thereof.

The invention also provides a composition comprising olefinically functionalized siloxane oligomers, more particularly at least one siloxane oligomer according to the idealized formula I, comprising as further components at least one organic solvent, an organic polymer, water, salt, filler, additive, pigment or a mixture of at least two of the stated components. The components may be added during the preparation of the composition and at a later point in time to the composition.

One particular advantage of the composition of the invention is that as a result of its preparation it has a very low chloride content and hence leads to a considerable improvement in fire protection properties in the context of processing in cable compounds. It is therefore a key advantage of the composition that as a liquid-phase product, optionally after removal of the hydrolysis alcohol and any solvent added, it can be used directly in an economic way in accordance with the invention. A further advantage of the compositions of the invention is that a composition viscosity of <3000 mPa s leads to an advantageously good processability on the part of the thermoplastics and elastomers processed accordingly in the extruder.

One particular advantage of the process of the invention is manifested in the use of solvents in combination with acidic hydrolysis and/or condensation catalysts under conditions of homogeneous catalysis. The acidic catalysts used in accordance with the invention are soluble in the solvent, the alkoxysilanes and the siloxane oligomers prepared. Moreover, the alkoxysilanes and the siloxane oligomers are soluble in the solvent. As a result of these measures it was made possible now for the first time, without a costly and inconvenient distillation, to obtain particularly narrow molar mass distributions of the siloxane oligomers and, at the same time, highly pure and virtually catalyst-free, acid-catalyst-free, more particularly total-chloride-free compositions of the siloxane oligomers in the form of a liquid-phase product.

Via the addition and/or the added amount of solvent, preferably alcohol, together with highly defined water quantity, the molecular weight and the molecular weight distribution are optimized and in this way the formation of high molecular mass oligomers is largely avoided. The unwanted oligomers of relatively high molecular mass are formed only at a low level.

A further aspect of the composition of the invention and of the process of the invention is that the process manages without use of basic catalysts, more particularly nitrogen-containing compounds, or acidic, sulphur-containing ion exchangers. Both catalysts lead to conditions of heterogeneous catalysis. Thus, for example, aqueous ammonia leads to the formation of emulsions, and the conversion over ion exchangers with sulphonic acid groups or sulphuric acid groups also results in conditions of a heterogeneous catalysis. It has been found that the conditions of a heterogeneous catalysis are not suitable for producing the desired narrow molar mass distribution of siloxane oligomers. Consequently, the compositions of the invention are free from acidic sulphur-containing groups, more particularly sulphuric acid groups or sulphonic acid groups, and/or free from nitrogen-containing compounds, more particularly from nitrogen-containing compounds which are introduced via basic catalysts. In the process of the invention it is also possible to do without the use of metal oxides in combination with an acid; the compositions of the invention are therefore free from metallic residues introduced as a result of adding metal oxides, such as, more particularly, copper oxides, iron oxides, aluminium oxides, copper halides, iron halides, copper hydroxide, iron hydroxide, aluminium hydroxide. Compositions of the invention therefore preferably contain only metals that are intrinsically present, the metal content being preferably less than 0.001 wt % to 0.1 ppm by weight. Correspondingly, in the process of the invention, it is possible to forgo the addition of basic compounds, such as calcium carbonate for the neutralization. The compositions of the invention consequently contain no additionally added calcium, and preferably they contain less than or equal to 1 wt %, more particularly less than or equal to 0.1 wt % to 0.1 ppm by weight, of calcium. The compositions and processes are therefore free from nitrogen-containing compounds, calcium-containing compounds, free from metal-containing compounds, especially metal oxides, and free from sulphur-containing compounds, more particularly free from acidic sulphur-containing compounds.

Compositions of the invention of olefinically functionalized siloxane oligomers have an alcohol content based on the composition, preferably a free alcohol content, of below 2 wt % to 0.0001 wt %, more particularly below 1.8 wt %, preferably below 1.5 wt %, more preferably below 1.0 wt %, very preferably below 0.5 wt % down to the detection limit. A composition has this low alcohol content, preferably free alcohol content, over at least 3 months, preferably over a period of 6 months. These low VOC contents can be ensured by the process of the invention, which provides particularly low-chlorine-content compositions of siloxane oligomers with a low alkoxy content.

Likewise provided by the invention is a process for preparing a composition comprising olefinically functionalized siloxane oligomers, and also, in particular, compositions obtainable by this process, in which (i) (at least) one olefinically functionalized alkoxysilane of the general formula II,

$$A\text{-}Si(R^2)_x(OR^1)_{3-x} \quad (II),$$

where in formula II A corresponds to an olefinic radical selected in particular from a linear, branched or cyclic alkenyl- or cycloalkenyl-alkylene-functional group having in each case 2 to 16 C atoms, $R^2$ independently corresponds to a linear, branched or cyclic alkyl radical having 1 to 15 C atoms and x is 0 or 1 and $R^1$ independently corresponds to a linear, branched and/or cyclic alkyl radical having 1 to 4 C atoms, more particularly with x being 0, (ii) in the presence of an acidic hydrolysis and/or condensation catalyst, more particularly of HCl, saturated or unsaturated organic acids, such as formic acid, acetic acid and/or fatty acids, e.g. myristic acid, and/or polyfunctional organic acids, such as citric acid, fumaric acid, (i.1) optionally with (at least) one alkoxysilane of the formula III,

$$B\text{—}Si(R^4)_y(OR^3)_{3-y} \quad (III),$$

where, in formula III, B corresponds to a saturated hydrocarbon radical, more particularly a saturated hydrocarbon radical selected from a linear, branched or cyclic alkyl radical having 1 to 16 C atoms, $R^3$ independently at each occurrence is a linear, branched or cyclic alkyl radical having 1 to 4 C atoms and $R^4$ is a linear, branched or cyclic alkyl radical having 1 to 15 C atoms and y is 0 or 1, more particularly y is 0, and (i.2) optionally with (at least) one tetraalkoxysilane of the formula IV, where in formula IV $R^3$ independently at each occurrence is a linear, branched and/or cyclic alkyl radical having 1 to 4 C atoms,

$$\text{Si}(OR^3)_4 \quad \quad (IV),$$

(iii) are reacted with water in a defined molar ratio of water to alkoxysilane alkoxy groups of 1:2.75 to 1:5.0, more preferably 1:2.75 to 1:4.5, 1:3.0 to 1:4.5 or 1:3.0 to 1:4.25, with further preference 1:3.5 to 1:4.25, optionally in the presence of a solvent, preferably in the presence of (at least) one alcohol as solvent, to give the siloxane oligomers, more particularly with x=0 and y=0 in formula II and III, and (iv) the hydrolysis alcohol and any solvent present are substantially separated off, and more particularly (v) the composition comprising olefinically functionalized siloxane oligomers is obtained, following step (iv), as the liquid-phase product.

Usefully in (iii) it is also possible to use water in a defined molar ratio of water to alkoxysilane alkoxy groups of 1:2 to 1:6, more particularly 1:2.5 to 1:5.5.

Here it has surprisingly also been found that the hydrolysis alcohol formed during the reaction acts as an entraining agent with respect to volatile catalysts, such as, for instance, HCl, formic acid and acetic acid, and so removes them from the system at least proportionally, preferably almost completely, in the course of a distillative removal of the hydrolysis alcohol, with the consequence, advantageously, that there is no need for an additional—costly and inconvenient—distillation in order to recover the end product. This is accomplished with particularly high purity with catalysts which are gaseous at room temperature and are highly soluble in the solvents, such as HCl.

Accordingly, in the process of the invention, it is possible advantageously in (v) for a composition of the invention comprising olefinically functionalized siloxane oligomers to be recovered or obtained directly, following step (iv), as a liquid-phase product, particularly advantageously since with the process of the invention, economically, there is no need for a costly and inconvenient, additional distillation of the product, with the product obtained nevertheless being of excellent quality.

Obtained more particularly here is a composition comprising a siloxane oligomer having a level of residues of the acid catalyst used in the preparation, such as chlorine, more particularly total chloride, of less than or equal to 250 mg/kg, more particularly less than or equal to 150 mg/kg, preferably less than or equal to 100 mg/kg, more preferably less than or equal to 75 mg/kg, more preferably less than or equal to 50 mg/kg, more particularly less than or equal to 35 mg/kg, with the hydrolysable chloride content being preferably less than 8 mg/kg, preferably less than or equal to 5 mg/kg, and/or preferably (vi) the silicon atoms, more particularly the overall sum total of silicon atoms, in the siloxane oligomer, preferably the structural elements $[(R^1O)_{1-x}(R^2)_x\text{Si}(A)O]_a$, $[\text{Si}(B)(R^4)_y(OR^3)_{1-y}O]_b$ and/or $[\text{Si}(Y)_2O]_c$ of the formula I being present together, in relation to all silicon atoms of the general formula I, at from less than or equal to 80% to greater than or equal to 30%, more particularly greater than or equal to 35%, as M structure, with a weight-average molecular weight (Mw) of the siloxane oligomer of greater than or equal to 315 g/mol, more particularly with an Mw of 315 to 850 g/mol, preferably of 315 to 800 g/mol, more preferably of 315 to 750 g/mol, with the polydispersity in each case, as the ratio of Mw/Mn, being more particularly 1.05 to 1.25, very preferably 1.05 to 1.18.

According to one alternative, in (i) at least one alkoxysilane of the formula II and optionally the transesterification products thereof are reacted in (ii) in the presence of an acidic hydrolysis and/or condensation catalyst (iii) with water in a defined molar ratio, as described above, (iv) the hydrolysis alcohol and the solvent optionally present are substantially separated off, and the composition is obtained, following step (iv), as the liquid-phase product.

According to a second alternative, in (i) at least one alkoxysilane of the formula II is reacted with (i.1) at least one alkoxysilane of the formula III and optionally, in each case independently, the transesterification products thereof in (ii) in the presence of an acidic hydrolysis and/or condensation catalyst (iii) with water in a defined molar ratio, as described above, (iv) the hydrolysis alcohol and the solvent optionally present are substantially separated off, and the composition is obtained, following step (iv), as the liquid-phase product.

According to a third alternative, in (i) at least one alkoxysilane of the formula II is reacted with (i.2) at least one alkoxysilane of the formula IV and optionally with (i.1) at least one alkoxysilane of the formula III, and also optionally, in each case independently, the transesterification products thereof, in (ii) in the presence of an acidic hydrolysis and/or condensation catalyst (iii) with water in a defined molar ratio, as described above, (iv) the hydrolysis alcohol and the solvent optionally present are substantially separated off, and the composition is obtained, following step (iv), as the liquid-phase product.

According to one alternative, reaction may also take place with water in a defined molar ratio of water to alkoxy groups of 1:2 to 1:6, more particularly 1:2.5 to 1:5.5.

Preferably the weight-average molecular weight (Mw) is greater than or equal to 420 g/mol and the number-average molecular weight (Mn) is greater than or equal to 400 g/mol for the siloxane oligomers, the polydispersity, as the ratio of Mw/Mn being 1.05 to 1.25, more preferably 1.05 to 1.18. With particular preference, greater than or equal to 90% (area %, GPC) have a molecular weight of less than or equal to 1000 g/mol.

With particular preference, in the process of the invention, an alkoxysilane of the formula II or alkoxysilanes of the formulae II and III, in each case optionally in the presence of an alkoxysilane of the formula IV, is or are reacted with water in a defined molar ratio of water to alkoxysilane alkoxy groups of 1:2.5 to 1:5.5, preferably of 1:2.75 to 1:5.0, more preferably of 1:2.75 to 1:4.5, alternatively very preferably of 1:3.0 to 1:4, with further preference 1:3.5 to 1:4.25, to give the siloxane oligomers. With further preference, x and y are 0.

According to one preferred embodiment, an alkenyl-functionalized alkoxysilane of the general formula II is reacted optionally together with an alkylalkoxysilane of the general formula III in the presence of a condensation catalyst. With further preference one alkenyltrialkoxysilane and optionally an alkyltrialkoxysilane are reacted in each case. The reaction may take place optionally in the presence of a solvent, preference being given to using the corresponding alcohol of the alkoxysilane. In the process of the invention it is possible with particular advantage to use 0.001 to 5 volume units of the corresponding alcohol per volume unit of alkoxysilane, more particularly trialkoxysilane. Further preference is given to using 0.5 to 2.5 volume units per volume unit of trialkoxysilane.

The solvent used and/or the alcohol used are anhydrous, the solvent or the alcohol being used more particularly with a water content of less than 1 ppm by weight. In the case of solvents containing water, this water content must be taken into account in the reaction.

As olefinically functionalized alkoxysilane, preference is given to using a silane of the general formula II,

$$A\text{-}Si(R^2)_x(OR^1)_{3-x} \qquad (II)$$

where A is a linear, branched or cyclic alkenyl- or cycloalkenyl-alkylene-functional group having in each case 2 to 18 C atoms, more particularly having 2 to 16 C atoms, preferably having 2 to 8 C atoms, alternatively having 2 to 6 C atoms, more preferably an alkenyl group having one to two double bonds, more preferably selected in each case independently from a vinyl, allyl, butenyl, pentenyl, hexenyl, ethylhexenyl, heptenyl, octenyl and cyclohexenyl-C1 to C8-alkylene group, preferably cyclohexenyl-2-ethylene, such as 3"-cyclohexenyl-2-ethylene or cyclohexadienyl-C1 to C8-alkylene, more preferably a cyclohexadienyl-2-ethylene group, with x in particular being 0, and $R^1$ independently selected from methyl, ethyl or propyl group. Particularly preferred are the vinyl, cyclohexenyl-2-ethylene, 3"-cyclohexenyl-2-ethylene and cyclohexadienyl-C1 to C8-alkylene groups.

Used preferably as alkoxysilane of the formula III is an alkoxysilane with an unsubstituted hydrocarbon radical B,

$$B\text{—}Si(R^4)_y(OR^3)_{3-y} \qquad (III),$$

which is selected from a methyl, ethyl, propyl, butyl, isobutyl, octyl, butyl, n-butyl, tert-butyl, pentyl, n-pentyl, isopentyl, neopentyl, hexyl, isohexyl, neohexyl-, 2,2-dimethylbutyl, 2,3-dimethylbutyl, 2-methylpentyl, 3-methylpentyl, n-octyl, isooctyl, nonyl, decyl, undecyl, dodecyl, $C_{13}H_{27}$-, $C_{14}H_{29}$-, $C_{15}H_{31}$ and hexadecyl group and $R^3$ is a methyl, ethyl or propyl group and y is 0 or 1. With particular preference B is selected from a methyl, ethyl, propyl, isobutyl, octyl and hexadecyl group. And $R^2$ and $R^4$ may independently of one another, in formula II and III, be preferably methyl, ethyl, propyl, butyl, pentyl, hexyl, cyclohexyl, heptyl, octyl, nonyl and also further aforementioned alkyl groups, and also alkyl groups known to the skilled person, including the structural isomers.

According to one alternative preferred embodiment, unsubstituted hydrocarbons having branched and/or cyclic alkyl radicals with 3 to 16 C atoms are employed as radical B. According to another preferred alternative of the invention, linear alkyl radicals having 1 to 6 C atoms are used as unsubstituted hydrocarbon radical B.

There is at least partial hydrolysis, and in particular at least partial co-condensation; preferably, the condensable, partially hydrolysed alkoxysilanes are subjected to substantially complete condensation. With particular preference, partial hydrolysis and condensation takes place only to the extent desired for the preparation of the oligomers with a preferred degree of oligomerization. In accordance with the invention the process is carried out batchwise.

The composition obtained is substantially free of solvents, such as alcohols. For this purpose, in accordance with the invention, the hydrolysis alcohol is removed, preferably by distillation, and the composition of the invention is obtained. Particularly gentle distillation of the hydrolysis alcohol and/or of the solvent takes place under reduced pressure. Depending on the procedure, a particularly economic process can be carried out without the addition of a solvent. In accordance with the invention, the composition prepared in this way, following removal of the hydrolysis alcohol and any solvent, does not itself have to be purified further, and more particularly does not itself have to be distilled, in order to be suitable for the uses according to the invention. Depending on the preparation procedure, the composition may optionally be filtered or decanted following removal of the hydrolysis alcohol. The process of the invention is therefore very much more economic than known processes where the oligomer, in order to be suitable for further application, must be purified by distillation.

According to the process of the invention, a composition comprising siloxane oligomers is obtained which after implementation of steps i, ii, iii, iv and also, optionally, v, optionally with (i.1) and/or (i.2), already has the low chlorine content of the invention, more particularly total chloride content, of less than or equal to 250 mg/kg, more particularly less than or equal to 150 mg/kg, preferably less than or equal to 100 mg/kg, more preferably less than or equal to 75 mg/kg, more preferably still less than or equal to 50 mg/kg, more particularly less than or equal to 35 mg/kg, with the hydrolysable chloride content being less than 8 mg/kg, preferably less than or equal to 5 mg/kg, and/or the weight-average molecular weight (Mw) being greater than 315 g/mol.

For the reaction in the presence of a defined molar ratio of water to alkoxysilane alkoxy groups of 1:2.75 to 1:5.0, all values in between, up to and including the second decimal place, are suitable for the reaction according to the invention, and the intermediate values 1:2.2; 1:2.4; 1:2.6; 1:2.8; 1:3.0; 1:3.2; 1:3.4; 1:3.6; 1:3.8; 1:4.0; 1:4.2; 1:4.4; 1:4.6; 1:4.8; 1:5.0; 1:5.2; 1:5.4; 1:5.6; 1:5.8; 1:5.8 and also all intermediate values plus/minus 0.1 of 1:2.0 to 1:6 are disclosed, preferably 1:3.0 to 1:4.5. Advantageously 1:2 to 1:6.

The water is preferably fully demineralized. To the skilled person it is clear that the water may be introduced initially, added in portions, added continuously or added together with one or all the silanes to the process. The water is preferably metered in continuously or with at least one interruption over a period of less than 1 minute to 100 minutes, and the reaction of the alkoxysilanes is carried out preferably at reaction temperatures in the range of preferably 20 to 80° C., or of 40° C. to 80° C., more preferably in the range from 50 to 80° C., more particularly at a pH of less than 7. The water contents of added solvents, such as alcohol, must be taken into account, as water, in the process.

Generally speaking, the water or an amount of water, in accordance with section (iii) of the present process, can be metered in continuously or with at least one interruption over a period of 1 to 1000 minutes and a temperature in the reaction mixture of 5 to 90° C. can be set, more particularly of 20 to 90° C. or of 37 to 90° C., preferably 40 to 90° C., more preferably 50 to 90° C., very preferably from 50 to 80° C., and preferably the pH is below 7; optionally, the water is added together with the catalyst, and optionally with a solvent, more particularly with an alcohol. The reaction can then take place, preferably, by this mixture (reaction mixture) being treated and/or further reacted optionally for at least 10 minutes to 36 hours, more particularly from 10 minutes to 8 hours, from 5 to 80° C., preferably from 40 to 80° C., preferably with mixing; optionally, the reaction mixture may also continue to react in the course of cooling. The composition obtained in this way can then be decanted or heated for distillative removal of the alcohol, such as the hydrolysis alcohol. From this crude product, the alcohol, optionally including catalyst, more particularly HCl, is preferably removed by distillation with heating under reduced pressure. The composition of the invention obtained is not itself distilled.

According to one optional embodiment, in the process according to section iv, the hydrolysis alcohol and the solvent present, more particularly the alcohol added as diluent, are removed by distillation, and advantageously at least once, preferably from two to six times, during the distillative work-up, a defined amount of alcohol is added and/or is added before or during the distillative removal of the hydrolysis alcohol and optionally solvent and/or diluent, more particularly of the alcohol.

It may be useful to add a defined amount of a reducing agent, more particularly of an inorganic reducing agent, such as alkali metal, alkaline earth metal, aluminium or a metal hydride, or a base, such as preferably HMDS or another amine or an alkali metal alkoxide, and thereafter the olefinically functionalized siloxane oligomer in the form of the liquid-phase product is advantageously filtered or decanted and/or the olefinic siloxane oligomer is contacted with an ion exchanger. According to the first alternative, precipitates or flocs formed by the filtering and/or decanting can be removed substantially from the composition comprising the siloxane oligomer. Preferably a defined amount of a reducing agent is added, more particularly of an inorganic reducing agent, very preferably a metallic reducing agent, such as alkali metal, preferably sodium, or as alkaline earth metal, preferably magnesium or calcium, or aluminium, and as metal hydride, preferably Li aluminium hydride, aluminium hydride, or, as base, preferably gaseous ammonia, Li diisopropylamide (LDA), Li isopropylhexylamide, hexamethyldisilazane (HMDS), and as alkali metal alkoxide, such as Na and/or K methoxide or Na and/or K ethoxide, or alkali metal alkylate, such as butyl-Li. Metal hydrides known to the skilled person, such as NaH or else lithium aluminium hydride (LAH), or bases which form precipitates of low solubility with the hydrogen chloride (HCl), may also be used in the process, additionally, in order to achieve a further reduction in the chlorine or chloride content of the composition. Bases suitable for the process ought not to form water on reaction with the catalyst, for example HCl, or with organically bonded chlorine, such as in chloroalkylsilanes.

The alcohol already present and/or alcohol formed in the reaction is removed substantially, preferably completely, from the reaction mixture in all process variants according to the invention. The distillative removal of the alcohol is carried out preferably under reduced pressure. The distillative removal of the alcohol is carried out preferably until the temperature obtained at the top of the column corresponds to the boiling temperature of water or to that of the siloxane oligomers. Alternatively until an alcohol content of less than 1.0 wt %, preferably less than or equal to 0.5 wt %, is detected, or down to the current analytical detection limit. Generally speaking, the resulting composition of the invention is then substantially solvent-free, more particularly alcohol-free. The composition obtained in this way preferably corresponds directly to the composition of the invention, and with preference need not itself be purified further.

In accordance with the invention the alcohol, more particularly both the hydrolysis alcohol and the optionally added alcohol, are removed substantially completely. The hydrolysis alcohol and/or the added alcohol correspond to the free alcohol. The free alcohol content of the overall composition is more preferably less than or equal to 2 wt % to 0.01 wt %, more particularly less than or equal to 1.5 wt % to 0.01 wt %, more preferably less than or equal to 1 wt % to 0.01 wt %, in particular down to the detection limit.

The process of the invention is preferably operated discontinuously, but can also be carried out continuously. Before or else after the removal of the alcohol, the composition may be admixed with at least one processing assistant such as silicone oil, such as polydimethylsiloxane, paraffin, liquid paraffin, or a mixture comprising one of these processing assistants.

According to one preferred variant of the process, the alkoxysilanes of the general formulae II, III and/or IV are subjected to at least partial hydrolysis and condensation in the presence of an acidic catalyst, more particularly with hydrogen chloride. Where necessary the hydrolysis and condensation may also take place in the presence of HCl and a co-catalyst. Co-catalysts contemplated include fatty acids. Alternatively it is also possible to use HCl and saturated or unsaturated organic acids, such as formic acid, acetic acid and/or fatty acids, such as myristic acid, for example, and/or polyfunctional organic acids, such as citric acid, fumaric acid, as catalyst or as co-catalyst with HCl.

In the case of one particularly preferred embodiment of the process of the invention, the silane of the formula II and the silane of the formula III may be used advantageously in a molar ratio of 1:1 with in each case plus/minus 0.5, from 0.5:1.5 to 1.5:0.5, and in particular the numerical values situated in between them in each case, 0.6; 0.7; 0.8; 0.9; 1.1; 1.2; 1.3 and also 1.4 are not to remain unstated.

Preferred alcohols correspond to the hydrolysis alcohol formed by the at least partial hydrolysis and/or condensation. They include ethanol or methanol. To the skilled person it is clear that the reaction can also be carried out in the presence of another customary solvent, preference being given to those which can be distilled off easily and preferably completely— these may be, for example but not conclusively, ethers, ketones, hydrocarbons or esters. Useful solvents may alternatively be ethyl acetate, THF, ketones, ethers or hydrocarbons. To the skilled person it is clear that for reasons of business and economy an alcohol is used as solvent that is also formed as hydrolysis alcohol. Mixtures of alcohols may therefore also be used in principle. In all process variants, the solvent and the alcohol formed in the reaction are preferably removed by distillation from the reaction mixture.

In the process of the invention, preferably, the viscosity of the composition is adjusted to less than or equal to 3000 mPa s, more particularly to less than or equal to 1000 mPa s, preferably to less than or equal to 500 mPa s to about 10 mPa s, more preferably to about 1 to 5 mPa s or 3 to 6 mPa s, with a fluctuation range of plus/minus 0.5 mPa s.

Further, in the process, the composition comprising olefinic siloxane oligomers, more particularly the liquid-phase product, preferably after the distillative removal of the solvent and/or alcohol, can be contacted with an ion exchanger, more particularly an anion exchanger, preferably an amine-functional ion exchanger, in order to reduce further the chloride content. In this process step it is advantageous that this measure, in contrast to a distillation, does not alter the degree of oligomerization and/or the degree of branching of the product. In the case of a distillation there would automatically be a separation of the siloxane oligomer into low, medium and high boilers (liquid phase). Through the use of the ion exchanger in accordance with the invention, the degree of oligomerization of the siloxane oligomers remains the same, and the chloride content can be lowered further.

As a result of the contacting with an ion exchanger, more particularly a basic anion exchanger, the chloride content or the content of chlorine, in ppm by weight, of the olefinic siloxane oligomers can be diminished preferably by at least 80% in relation to the siloxane oligomers supplied to the ion exchanger. With further preference, the chlorine content in ppm by weight of the olefinic siloxane oligomers, in relation to those supplied, is diminished by at least 85%, preferably by at least 90%, more preferably at least by 92%, more particularly at least by 95%, and with further preference by at least 98%. Depending on the olefinically functionalized siloxane oligomer and on the initial concentration of chlorine, and on the flow rate and contact time with the anion exchanger, the chlorine content can be lowered preferably to below 100 mg/kg, preferably to below 50 mg/kg, more preferably to below 25 mg/kg.

In the case of olefinically functionalized siloxane oligomers having a chlorine content, with hydrolysable chlorine, more particularly chlorine-functional alkylalkoxysilanes and/or alkylalkoxysilanes with HCl, the hydrolysable chloride content, preferably at flow rates of 0.01 m/h to 15 m/h, preferably up to 5 m/h, more particularly up to 2.5 m/h, can be reduced by at least 80%, more particularly by at least 85%, preferably by at least 90%, more preferably at least by 92%, more particularly at least by 95%, and further preferably by at least 98%; here, in particular, the olefinically functionalized siloxane oligomers do not undergo further condensation, and the anion exchanger column preferably has a diameter of 3 cm and a height of 15 cm. Very good results in diminishing hydrolysable chlorine, of up to 80%, are also obtained at flow rates of up to 10 m/h.

In the process of the invention, the anion exchanger has a carrier polymer with quaternary alkylammonium groups and/or with tertiary dialkylamino groups, the quaternary alkylammonium groups in particular having essentially hydroxide ions as counterions, and/or the tertiary dialkylamino groups being in the form of the free base. It is particularly preferred in this context if the basic anion exchanger is a styrene-divinylbenzene copolymer having trialkylammonium groups, more particularly in the OH form, and/or a styrene-divinylbenzene copolymer having dialkylamino groups in the form of the free base. When using basic anion exchangers with a styrene-divinylbenzene copolymer having trialkylammonium groups in the chloride form, the chlorides are converted into the OH form prior to use, using an alkali metal hydroxide solution, for example. Alkali metal hydroxide solutions used are preferably aqueous solutions of potassium hydroxide, sodium hydroxide or else other water-soluble or water/alcohol-soluble bases, such as ammonia or alkali metal carbonates, for example $Na_2CO_3$. After the conversion of the anion exchanger into the OH form, before the contacting with the olefinic siloxane oligomers, the anion exchanger is rinsed with an alcohol, in order in particular to displace excess water. Alcohol used is preferably the alcohol which would be formed by hydrolysis of the respective alkoxy groups. In the case of methoxy groups, methanol, or ethanol in the case of ethoxy groups in the alkoxysilane.

Quaternary ammonium groups include not only alkylammonium but also N-alkyl-imine-functional groups, such as N-alkylpyridinium groups. Suitable alkyl groups contain 1 to 20 C atoms, preferably with 1 to 4 C atoms, and are preferably methyl or ethyl groups. In accordance with the invention the weakly basic anion exchangers are loaded with hydroxide ions and in particular they have nitrogen-containing groups.

It has surprisingly emerged that in view of the further reduction in the chlorine content, the functional siloxane oligomers obtained by the process of the invention are much more stable towards hydrolysis, despite the fact that, in contrast to what has been the case to date, they are no longer laboriously distilled. As a result, the siloxane oligomers of the invention prove to be more stable than known oligomers, and at the same time their VOC content is reduced significantly relative to the prior-art oligomers.

The level of solvents, such as VOC, more particularly of free alcohol, this level being stable over a period of 6 to 12 months, in relation to the overall composition is preferably below 2 wt %, more particularly less than or equal to 1 wt %, more preferably less than or equal to 0.4 wt %, preferably less than or equal to 0.3 wt % down to the detection limit.

Compounds of the formula II which can be used in the process of the invention are as follows: vinyltriethoxysilane, vinyltrimethoxysilane, allyltriethoxysilane, allyltrimethoxysilane, butenyltriethoxysilane, butenyltrimethoxysilane, cyclohexenyl-alkylene-trimethoxysilane, more particularly cyclohexenyl-2-ethylene-trimethoxysilane, cyclohexadienyl-C1 to C8-alkylenetriethoxysilane or cyclohexadienyl-2-ethylenetriethoxysilane, cyclohexenyl-2-ethylenetrimethoxysilane, 3"-cyclohexenyl-2-ethylenetrimethoxysilane, cyclohexadienyl-C1 to C8-alkylenetrimethoxysilane or cyclohexadienyl-2-ethylenetrimethoxysilane, cyclohexenyl-2-ethylene-triethoxysilane, more preferably 3"-cyclohexenyl-2-ethylene-triethoxysilane and/or 3"-cyclohexenyl-2-ethylene-trimethoxysilane, cyclohexenedienyl-alkylenetriethoxysilane, hexenyltriethoxysilane, hexenyltrimethoxysilane, ethylhexenyltrimethoxysilane, ethylhexenyltriethoxysilane, octenyltriethoxysilane, octenyltrimethoxysilane, the methoxy-substituted compounds being particularly preferred.

Alkylalkoxysilane compounds of the formula III that can be used with preference are as follows:
compounds of the formula III with y=0 or 1, where B is a linear or branched alkyl radical having 1 to 18 C atoms, more particularly having 1 to 8 C atoms, preferably a methyl, ethyl, more preferably n-propyl, isopropyl, butyl, pentyl, hexyl, heptyl, octyl, hexadecyl or octadecyl radical, $R^4$ is a linear, branched or cyclic alkyl radical having 1 to 15 C atoms, more particularly having 1 to 8 C atoms, preferably a methyl, ethyl, more preferably n-propyl, isopropyl and/or octyl radical, and $R^3$ is a linear and/or branched alkyl radical having 1 to 3 C atoms, more preferably a methyl, ethyl and/or isopropyl or n-propyl radical. With particular preference B is a methyl, ethyl, propyl, octyl, hexadecyl or octadecyl radical, $R^4$ is a methyl or ethyl radical, and $R^1$ is a methyl or ethyl radical, particular preference being given to the methoxy-substituted compounds.

Preferred compounds of the formula III, stated by way of example, are as follows: methyltrimethoxysilane, methyltriethoxysilane (MTES), propyltrimethoxysilane (PTMO), dimethyldimethoxysilane (DMDMO), dimethyldiethoxysilane, propylmethyldimethoxysilane, propylmethyldiethoxysilane, isopropyltriethoxysilane, n-propyltriethoxysilane, n-octylmethyldimethoxysilane, n-hexylmethyldimethoxysilane, n-hexylmethyldiethoxysilane, propylmethyldiethoxysilane, propylmethyldiethoxysilane, propyltriethoxysilane, propyltrimethoxysilane, butyltriethoxysilane, butyltrimethoxysilane, isobutyltrimethoxysilane, isobutyltriethoxysilane, n-butyltriethoxysilane, n-butyltrimethoxysilane, hexyltriethoxysilane, pentyltrimethoxysilane, pentyltriethoxysilane, hexyltrimethoxysilane, n-hexyltrimethoxysilane, isohexyltriethoxysilane, isohexyltrimethoxysilane, heptyltrimethoxysilane octyltrimethoxysilane, octyltriethoxysilane, n-octyltrimethoxysilane, n-octyltriethoxysilane, isooctyltrimethoxysilane, isooctyltriethoxysilane, n-hexyltriethoxysilane, cyclohexyltriethoxysilane, n-propyltri-n-butoxysilane, n-propyltrimethoxysilane, isopropyltrimethoxysilane, heptyltrimethoxysilane, n-octyltriethoxysilane, isooctyltriethoxysilane, undecyltriethoxysilane, decyltriethoxysilane, nonadecyltriethoxysilane, dodecyltriethoxysilane, $C_{13}H_{27}$-triethoxysilane, $C_{14}H_{29}$-triethoxysilane or $C_{15}H_{31}$-triethoxysilane, n-octyltrimethoxysilane, isooctyltrimethoxysilane, undecyltrimethoxysilane, decyltrimethoxysilane, nonadecyltrimethoxysilane, dodecyltrimethoxysilane, $C_{13}H_{27}$-trimethoxysilane, $C_{14}H_{29}$-trimethoxysilane or $C_{15}H_{31}$-trimethoxysilane, hexadecyltriethoxysilane, hexadecyltrimethoxysilane, octadecyltriethoxysilane, octadecyltrimethoxysilane, octadecylmethyldiethoxysilane, octadecylmethyldimethoxysilane, hexadecylmethyldimethoxysilane and/or hexadecylmethyldiethoxysilane, and also mixtures of these silanes, or a mixture comprising at least two of the silanes, and also transesterification products thereof.

Particularly preferred combinations of compounds of the formulae II, III and optionally IV for preparing the olefinically functionalized siloxane oligomers, and the olefinically functionalized siloxane oligomers obtainable therefrom, are as follows, with siloxane oligomers being prepared preferably without addition of compounds of the formula IV: in this list, the compounds enclosed in each case by semi-colons are used in the process for preparing the siloxane oligomers: vinyltriethoxysilane (VTEO); vinyltrimethoxysilane (VTMO); vinyltriethoxysilane and tetraethoxysilane; vinyltrimethoxysilane and tetramethoxysilane; vinyltriethoxysilane and methyltriethoxysilane; vinyltriethoxysilane, methyltriethoxysilane and tetraethoxysilane (TEOS); vinyltrimethoxysilane and methyltrimethoxysilane; vinyltrimethoxysilane, methyltrimethoxysilane and tetraethoxysilane or tetramethoxysilane; vinyltriethoxysilane and ethyltriethoxysilane; vinyltriethoxysilane, ethyltriethoxysilane and tetraethoxysilane; vinyltrimethoxysilane and ethyltrimethoxysilane; vinyltrimethoxysilane, ethyltrimethoxysilane and tetramethoxysilane or tetraethoxysilane; vinyltriethoxysilane and propyltriethoxysilane; vinyltriethoxysilane, propyltriethoxysilane and tetraethoxysilane; vinyltrimethoxysilane and propyltrimethoxysilane; vinyltrimethoxysilane, propyltrimethoxysilane and tetraethoxysilane or tetramethoxysilane; vinyltriethoxysilane and isobutyltriethoxysilane; vinyltriethoxysilane, isobutyltriethoxysilane and tetraethoxysilane; vinyltrimethoxysilane and isobutyltrimethoxysilane; vinyltrimethoxysilane, isobutyltrimethoxysilane and tetramethoxysilane; vinyltrimethoxysilane and heptyltrimethoxysilane; vinyltrimethoxysilane and heptyltriethoxysilane; vinyltrimethoxysilane and hexyltrimethoxysilane; vinyltrimethoxysilane and hexyltriethoxysilane; vinyltriethoxysilane and octyltriethoxysilane; vinyltriethoxysilane, octyltriethoxysilane and tetraethoxysilane; more particularly with vinyltriethoxysilane and tetraethoxysilane in a ratio of 1:0.20 to 1:0; vinyltrimethoxysilane and octyltrimethoxysilane; vinyltrimethoxysilane, octyltrimethoxysilane and tetramethoxysilane; more particularly with vinyltrimethoxysilane and tetramethoxysilane in a ratio of 1:0.2 to 1:0; vinyltriethoxysilane and hexadecyltriethoxysilane; vinyltrimethoxysilane and hexadecyltrimethoxysilane; vinyltriethoxysilane and tetramethoxysilane in a ratio of 1:0.2 to 1:0 and hexadecyltriethoxysilane; vinyltrimethoxysilane and tetramethoxysilane in a ratio of 1:0.2 to 1:0 and hexadecyltrimethoxysilane.

Also used with particular preference in the process of the invention, in each case independently, are at least one cyclohexenyl-2-ethylene-trialkoxysilane, 3"-cyclohexenyl-2-ethylene-trialkoxysilane or cyclohexadienyl-C1 to C8-alkylene groups. Alternatively, likewise with particular preference, it is possible, as combinations in the process of the invention, in each case independently, for at least one cyclohexenyl-2-ethylene-trialkoxysilane, 3"-cyclohexenyl-2-ethylene-trialkoxysilane or cyclohexadienyl-C1 to C8-alkylene groups to be reacted with one of the aforementioned alkylalkoxysilanes.

Particularly preferred processes are based on the reaction of, or preferred siloxane oligomers are obtainable by the reaction of, a) vinyltriethoxysilane, b) vinyltrimethoxysilane, c) vinyltriethoxysilane and propyltriethoxysilane, vinyltrimethoxysilane and propyltrimethoxysilane, vinyltrimethoxysilane and propyltriethoxysilane, or vinyltriethoxysilane and propyltrimethoxysilane, or by reaction of a), b), c) in each case independently with tetraethoxysilane, or of a), b) and c) in each case independently with tetramethoxysilane.

Additionally or alternatively to one of the aforementioned features, it is also possible in the process to use, as processing assistant, at least one silicone oil, such as polydimethylsiloxane, paraffin, liquid paraffin, or a mixture comprising one of these processing assistants. A particularly preferred processing assistant is polydimethylsiloxane, preferably having a kinematic viscosity of around 150 to 400 mm$^2$/s; particularly preferred alternatives have a viscosity of around 200 mm$^2$/s or around 350 mm$^2$/s.

The invention also provides the following process for producing the composition, and a composition obtainable by this process, being in particular of particularly low chlorine content, preferably with the following individual steps:
1) at least one olefinically functionalized alkoxysilane of the formula II, and optionally an alkoxysilane of the formula III and optionally an alkoxysilane of the formula IV, optionally as a mixture, preferably are introduced as an initial charge, optionally a solvent is added for dilution, preferably the corresponding alcohol to the hydrolysis alcohol.
2) at least one acidic hydrolysis and/or condensation catalyst, such as HCl, an organic saturated or unsaturated carboxylic acid, is added and a defined molar ratio of water to alkoxysilane alkoxy groups is set. The pH set here is preferably less than 7, preferably from 1 to 6, more preferably from 3 to 5. Alternatively it is possible optionally to prepare a mixture (1+2) comprising at least one of the silanes of the formula II, III and optionally IV, optionally with an alcohol, in an amount by weight of 0.2 to 8 times, preferably 0.2 to 1.0 times, in relation to the silanes of the formulae II, III and optionally IV, more particularly methanol or ethanol, depending on the alkoxysilane used, and a defined amount of water, with preferably at least one acidic hydrolysis and/or condensation catalyst, such as HCl, being in solution in the defined amount of water. The pH set here is preferably less than 7, preferably from 1 to 6, more preferably from 3 to 5.

The invention also provides the following process for producing the composition, and a composition obtainable by this process, being in particular of particularly low chlorine content, preferably with the following individual steps:
1) at least one olefinically functionalized alkoxysilane of the formula II, and optionally an alkoxysilane of the formula III, are introduced as an initial charge, and optionally, in each case independently, additionally and where appropriate, an alkoxysilane of the formula IV, with the alkoxysilanes being introduced as an initial charge preferably in the form of a mixture,
2) addition of a mixture comprising solvent, water and HCl as acidic hydrolysis and/or condensation catalyst, the solvent being the corresponding alcohol to the hydrolysis alcohol, and a defined molar ratio of water to alkoxysilane alkoxy groups of 1:2.57 to 1:5.0 being set, preferably 1:3.0 to 1:4.5, the alcohol being used preferably in an amount by weight of 0.2 to 8 times in relation to the silanes of the formulae II, III and optionally IV, preferably 0.2 to 3.0 times. With further preference an amount by weight of alcohol is used which is from 0.2 to 1.5 times, more particularly 0.2 to 1.0 times, more preferably 0.3 to 0.8 times in relation to the weight of the silanes of the formulae II, III and optionally IV.

To this end, preferably in an initial charge, such as in a stirred tank, alkoxysilanes and the water are reacted with mixing. The defined amount of water can be metered continuously or with at least one interruption over a period of 1 to 1000 minutes. The temperature of the reaction mixture is set preferably at 5 to 90° C. for the reaction, preferably at 20 to 55° C., more preferably at 30 to 40° C. or at about 35° C. Following the addition of the mixture, the temperature of the reaction mixture formed is increased further, being set more particularly at the reflux temperature of the alcohol. For example, by heating of the reaction mixture to a temperature of 40 to 80° C., preferably of 50 to 80° C., more preferably to around 55 to 80° C., in accordance with the invention to about the boiling temperature of the alcohol.

Over a period of at least 10 minutes to 36 hours, preferably 10 min to 8 h, at a reaction temperature of 5 to 80° C., preferably 40° C. to 80° C., the reaction mixture may continue reacting, preferably with mixing, as for example with stirring.

3) after the end of reaction, the alcohol is removed. Heating under reflux is carried out preferably for a number of hours, as for example about 2 to 10 hours, preferably 3 to 5 hours, more preferably around 3.5 hours, and subsequently 4) the alcohol, comprising the hydrolysis alcohol and the alcohol introduced, and also, optionally, water, are removed by distillation, preferably under reduced pressure and at elevated temperature, preferably until the reaction mixture or the composition obtained is substantially solvent-free, more particularly alcohol-free.

The alcohol is distilled preferably at a liquid-phase temperature of 0° C. to 100° C. under a pressure of 300 bar to 1 mbar, and at the same time HCl is distilled off, more preferably at 40° C. to 100° C. under a pressure of 250 bar to 10 bar. The composition according to the invention, of olefinically functionalized siloxane oligomers, is obtained.

To the skilled person it is clear that the functional siloxane oligomers prepared in this way, depending on their desired application, may be diluted with a diluent or else may be admixed or compounded with a polymer, such as a thermoplastic base polymer, such as PE, PP or an elastomer, such as EVA. Further thermoplastic base polymers and elastomers are given as examples below; the skilled person is aware that in general all thermoplastic base polymers or polymers or elastomers are suitable. The skilled person knows of customary diluents for alkoxysilanes, examples that may be mentioned here being alcohols, ethers, ketones, hydrocarbons, or else mixtures of these. Depending on their desired application, therefore, the compositions of the functional siloxane oligomers may be prepared as a concentrate or else as a dilute composition from 99.9 to 0.001 wt %, and also all values situated in between, of functional siloxane oligomers in the overall composition. Preferred dilutions contain 10 to 90 wt % of functional siloxane oligomers, more preferably 20 to 80 wt %, with further preference 30 to 70 wt %.

Thermoplastic base polymers for the purposes of the invention are, in particular, acrylonitrile-butadiene-styrene (ABS), polyamides (PA), polymethyl methacrylate (PMMA), polycarbonate (PC), polyethylene (PE), such as LDPE, LLD-PE, m-PE, polypropylene (PP), polystyrene (PS), polyvinyl chloride (PVC), chloroprene, and also the ethylene-vinyl acetate copolymers (EVA), EPDM or EPM polymers based on ethylene units, and/or celluloid or silane-copolymerized polymers, and, for example, base polymers prepared from unsaturated functional monomers including silanes, such as VTMO, VTEO and monomers such as ethylene and other olefins, and also monomers and/or prepolymers precursor compounds of these base polymers, such as ethylene and propylene. Further preferred elastomers may be selected from the series of ethylene-propylene rubber (EPR), ethylene-propylene-diene rubber (EPDM), styrene-butadiene rubber (SBR), natural rubber (NR), acrylate copolymer rubber (ACM), acrylonitrile-butadiene rubber (NBR) and/or polybutadiene rubber (BR).

The invention also provides compositions obtainable by the process of the invention, comprising olefinically functionalized siloxane oligomers, more particularly siloxane oligomers whose weight-average molecular weight (Mw) is greater than or equal to 315 g/mol, and preferably whose number-average molecular weight (Mn) is greater than or equal to 300 g/mol, the polydispersity, as the ratio of Mw/Mn, being more particularly 1.05 to 1.25, with particular preference 1.05 to 1.20. With further preference the weight-average molecular weight (Mw) is greater than or equal to 420 g/mol and the number-average molecular weight (Mn) is greater than or equal to 400 g/mol, the polydispersity, as the ratio of Mw/Mn, being 1.05 to 1.25, more preferably 1.05 to 1.17. It is further preferred here if the compositions obtainable have greater than or equal to 90% (area %, GPC) of siloxane oligomers with a molecular weight of less than or equal to 1000 g/mol. The compositions thus obtainable may be diluted at any time simply with a diluent. As a consequence of the process, a composition can be obtained which indicates an acidic pH in the presence of moisture. Customarily the pH can be between 2 and 6.

At the same time, preferably, the total chloride content of these compositions is advantageously less than or equal to 250 mg/kg, more particularly less than or equal to 80 mg/kg, with further preference less than or equal to 50 mg/kg, in relation to the overall composition.

In order to permit rapid distribution in the extruder, without suffering excessive mass losses in the hot extruders, a balanced ratio between the molecular weight Mw and the TGA temperature at which 5% or 50% mass loss occurs should be maintained. The abovementioned compounds customarily exhibit mass loss of 50% at temperatures well above 200° C., more particularly above 220° C. The compositions of the invention are therefore very suitable for application in extruders, and at the same time, by virtue of the very narrowly constrained molecular weight, permit rapid distribution of the siloxane oligomers in the thermoplastics. Another contributor to this effective distribution or dispersibility are the slightly increased T structures in the siloxanes, since the molecules are more compact.

The invention also provides for the use of the composition of the invention or of the compositions prepared by the process of the invention as adherence agent, as crosslinking agent by graft polymerization and/or hydrolytic condensation in a conventional way, for producing mineral-filled polymers (compounds) and/or prepolymers and polymers grafted with olefinically functionalized siloxane oligomers, particularly in connection with the production of thermoplastics or elastomers, preferably of mineral-filled thermoplastics, elastomers or prepolymers thereof, for the grafting of or in the polymerization of thermoplastic polyolefins, as drying agents, more particularly as water scavengers for silicone sealants, in crosslinkable polymers for producing cables, for producing crosslinkable polymers, as oil phase in an emulsion and/or together with organosilanes or organopolysiloxanes. With regard to the joint use, according to the invention, of the composition with organosilanes or organosiloxanes, reference is made in full to the disclosure content of EP 1 205 481 B1, more particularly to the disclosure content of paragraph [0039] and to the list of organosilanes and organosiloxanes that is disclosed therein. Furthermore, compositions of the invention find use advantageously for filler modification (filler coating), resin modification (additive), surface modification (functionalization, hydrophobization), as constituent in coating systems (especially sol-gel systems or hybrid systems), for modifying cathodes and anode materials in batteries, as electrolyte fluid, as additive in electrolyte fluids, for the modification of fibres, more particularly glass fibres and natural fibres, and for modifying textiles, for modifying fillers for the synthetic stone industry, as architectural preservative or constituent in architectural preservative, as addition for compositions with mineral curing, for modifying wood, wood fibres and cellulose. Furthermore, the entire disclosure content of DE 10 2011 086 862.3 with the filing date of 22 Nov. 2011, filed at the German Patent and Trade Mark Office, is made part of the content of the present invention.

The invention is elucidated in more detail by the examples below, without being confined to these working examples.

EXAMPLES

Determination of molecular weight: Molar mass or the molecular weight, and also the molar mass distribution, can be determined by means of gel permeation chromatography (GPC). The GPC analysis method is described exhaustively in references including "Modern Size-Exclusion Liquid Chromatography", Andre Striegel et al., Wiley & Sons, 2nd edn. 2009. To calibrate the method for siloxane analyses it is possible here to use, for example, divinyltetramethoxydisiloxane or divinyltetraethoxydisiloxane as a standard. Percentages in relation to the olefinic siloxane oligomers in the present document correspond to a figure in area percent, which may be determined from GPC analyses. MZ-Analysetechnik columns used: Columns: 50×8.0 mm, MZ-Gel SDplus (styrene/divinylbenzene copolymer with high degree of crosslinking, spherical particle shape), porosity 50 A (angstroms, Å), 5 μm (micrometres) (preliminary column), 300× 8.0 mm, MZ-Gel SDplus, porosity 50 A (angstroms, Å), 5 μm, 300×8.0 mm, MZ-Gelplus, porosity 100 A (angstroms, Å), 5 μm, 300×8.0 mm, MZ-Gel SDplus, porosity 500 A (angstroms, Å), 5 μm; eluent and pump flow rate: methyl ketone (MEK) at 1 ml/min, standard substance: internal standard—1 g/l ethylbenzene in 1% strength sample solution. The instrument is calibrated beforehand against the respective substance (monomer, dimer, trisiloxane, etc.). Instrument from Agilent: 1100 Series isotactic pump G1310A, 1100 Series column oven G1316A, 1100 Series RID detector G1362A, manual injector G1328A, vacuum degasser G1322A, GPC software (PSS WinGPC Unity).

Determination of Chlorine Content and Total Chloride: The silane is digested with oxygen in a bomb calorimeter and then hydrolysed with acetic acid and hydrofluoric acid. The chloride content of the resulting solution is determined by titration with a well-defined silver nitrate solution.

Determination of chlorine content and hydrolysable chloride: After hydrolysis with acetic acid, a determination is made of the chloride content by titration with a well-defined silver nitrate solution.

Determination of SiO$_2$ content—crucible method: The SiO2 content is determined by acid digestion with concentrated sulphuric acid and subsequent evaporation, by fluorination.

GC Analysis: As part of the GC standard analysis well known to the skilled person, the monomer content is determined by appropriate calibration and optionally internal standard.

$^{29}$Si NMR spectrometry: Furthermore, the monomer content, and also M, D and T structures, can be determined using $^{29}$Si NMR spectrometry, which is likewise well known to the skilled person.

Determination of dynamic viscosity: The dynamic viscosity was determined in accordance with DIN 53015.

Alcohol after hydrolysis: A defined amount of a sample is admixed with sulphuric acid (25% strength). Then a defined amount of water is added and neutralization takes place with aqueous sodium hydroxide solution (20% strength). After a steam distillation has been carried out, the alcohol content is determined by GC against an internal standard (sec-butanol, HP 5890 with HP 3396 integrator, 1 ml/min).

Flash point determination: DIN EN ISO 13736 (January 2009), DIN EN ISO 2719 (September 2003). Flash points above 40° C. are determined by means of DIN EN ISO 2719 (=DIN 51758=EN 22719), and between −30° C. and +40° C. according to DIN EN ISO 13736 (=DIN 51755).

Water content: Karl-Fischer (DIN 51777)

TGA: In the TGA (thermogravimetric analysis), a sample for analysis is placed, in a crucible, onto a balance. The sample itself is located, during the measurement, in a heatable oven. The crucible is usually open (no lid, or lid with holes). The interior of the oven is flushed with an inert gas (N$_2$) in order to avoid possible reactions resulting from oxygen contact.

Instrument: TG 209 from Netzsch, temperature range: RT to about 1000° C.

Heating rate: 10 K/min, initial mass: about 10-12 mg, crucible: platinum with hole in the lid.

Further information on TGA analyses is found in, for example, the Internet textbook: Moderne Pharmazeutische Technologie 2009, Cornelia M. Keck, Reiner H. Müller, Section 3.5, Thermoanalysis, Lothar Schwabe, FU Berlin, page 76, Fig.: 5, http://pharmazie-lehrbuch.de/Moderne%20Pharmazeutische%20 Technologie.pdf or in other textbooks on analytical methods.

TABLE 1

Overview of raw materials used.

| Type of compound | Designation |
|---|---|
| Silane | Vinyltrimethoxysilane (VTMO) |
| | Vinyltriethoxysilane (VTEO) |
| | Propyltriethoxysilane (PTEO) |
| Alcohol | Methanol |
| | Ethanol |
| Acid | 37% Strength hydrochloric acid |
| Silicone oil | AK 350 (Wacker) |
| Stabilizer | Irganox 1010 |
| Peroxide | Dicumyl peroxide |

Example 1

VTMO-Siloxane Oligomer—Ratio of Water to Alkoxy 1:3.7—V087

Vinyltrimethoxysilane oligomer: 220 g of vinyltrimethoxysilane were charged to a reaction flask. 95 g of methanol were mixed with 21 g of water and 0.4 g of 20% strength hydrochloric acid, and the mixture was transferred to a dropping funnel. At a temperature of about 25° C., dropwise addition to the vinylsilane took place from the dropping funnel, slowly and with stirring. After the end of the addition, the oil bath was heated to 85° C., and so the methanol boiled under reflux. After a reaction time of around three hours, the methanol was distilled off at the stated oil bath temperature and at a reduced pressure of about 150 to 180 mbar. For further removal of methanol, the vacuum was set to below 1 mbar.

Example 2

VTEO-Siloxane Oligomer—Ratio of Water to Alkoxy 1:3.7—V088

Vinyltriethoxysilane oligomer: 195 g of vinyltriethoxysilane were charged to a reaction flask. 93 g of ethanol were mixed with 14.8 g of water and 0.2 g of 20% strength hydrochloric acid and the mixture was transferred to a dropping funnel. At a temperature of about 25° C., dropwise addition to the vinylsilane took place from the dropping funnel, slowly and with stirring. After the end of the addition, the oil bath was heated to 85° C., and so the ethanol boiled under reflux. After a reaction time of around three hours, the ethanol was distilled off at the stated oil bath temperature and at a reduced pressure of about 150 to 180 mbar. For further removal of ethanol, the vacuum was set to below 1 mbar.

Example 3

PTEO/VTEO-Siloxane Oligomer—Ratio of Water to Alkoxy 1:4.0—V089

Co-oligomer of propyltriethoxysilane with vinyltriethoxysilane: 98 g of vinyltriethoxysilane and 100 g of propyltriethoxysilane were charged to a reaction flask. 87 g of ethanol were mixed with 13 g of water and 0.2 g of 20% strength hydrochloric acid, and the mixture was transferred to a dropping funnel. At a temperature of about 25° C., dropwise addition to the vinylsilane took place from the dropping funnel, slowly and with stirring. After the end of the addition, the oil bath was heated to 85° C., and so the ethanol boiled under reflux. After a reaction time of around three hours, the ethanol was distilled off at the stated oil bath temperature and at a reduced pressure of about 150 to 180 mbar. For further removal of ethanol, the vacuum was set to below 1 mbar.

Example 4

VTEO/PTEO-Siloxane Oligomer—Ratio of Water to Alkoxy 1:4.8—V097

Procedure: A 2 l four-necked apparatus with water cooling and magnetic stirrer was charged with 190.3 g of VTEO and 206.2 g of PTEO (propyltriethoxysilane). Subsequently a mixture of ethanol, double-distilled water and hydrochloric acid (37%) was metered in at 35° C. under ambient pressure. An exothermic reaction took place. If the temperature rose above 60° C., metering was interrupted. The total reaction time ran to 5 hours with stirring, beginning at 79° C., following complete metered addition of the $H_2O$/EtOH/HCl mixture. After the reaction time, the alcohol was distilled at up to 100° C. and 100 mbar on a rotary evaporator. When 100 mbar were reached, this pressure was maintained for 15 minutes more, after which the system was let down. The resulting liquid phase was a vinyl- and propyl-functionalized siloxane oligomer of VTEO and PTEO (VTEO/PTEO-siloxane).

TABLE 2

Raw materials V097

| Compound | Initial mass |
|---|---|
| VTEO | 190.3 g |
| PTEO | 206.2 g |
| Water | 22.7 g |
| Ethanol | 174.6 g |
| Hydrochloric acid | 0.19 g |

Example 5

VTEO/PTEO-Siloxane Oligomer—Ratio of Water to Alkoxy 1:4.0—V098

Procedure: A 2 l four-necked apparatus with water cooling and magnetic stirrer was charged with vinyltrimethoxysilane (VTEO) and propyltriethoxysilane (PTEO). Subsequently a mixture of ethanol, double-distilled water and hydrochloric acid (37%) was metered in at 35° C. under ambient pressure. An exothermic reaction took place. If the temperature rose above 60° C., metering was interrupted. The total reaction time ran to 5 hours with stirring, beginning at 79° C., following complete metered addition of the $H_2O$/EtOH/HCl mixture. After the reaction time, the alcohol was distilled at up to 100° C. and 100 mbar on a rotary evaporator. When 100 mbar were reached, this pressure was maintained for 15 minutes more, after which the system was let down. The resulting liquid phase was VTEO-/PTEO-siloxane oligomer.

TABLE 3

Raw materials V098

| Compound | Initial mass |
|---|---|
| VTEO | 190.3 |
| PTEO | 206.4 g |
| Water | 27.2 g |
| Ethanol | 175.1 g |
| Hydrochloric acid | 0.19 g |

Example 6

VTEO/PTEO/TEOS-Siloxane Oligomer—Ratio of Water to Alkoxy 1:5.0 (5.1)—V099

Procedure: A 2 l four-necked apparatus with water cooling and magnetic stirrer was charged with 190.3 g of VTEO, 206.4 g of PTEO and 20.9 g of tetraethoxysilane. Subsequently a mixture of ethanol, double-distilled water and hydrochloric acid (37%) was metered in at 35° C. under ambient pressure. An exothermic reaction took place. If the temperature rose above 60° C., metering was interrupted. The total reaction time ran to 5 hours with stirring, beginning at 79° C., following complete metered addition of the $H_2O$/EtOH/HCl mixture. After the reaction time, the alcohol was distilled at up to 100° C. and 100 mbar on a rotary evaporator. When 100 mbar were reached, this pressure was maintained for 15 minutes more, after which the system was let down. The resulting liquid phase was a vinyl- and propyl-functionalized siloxane oligomer with Q structural elements, based on the VTEO, PTEO and tetraethoxysilane used for the controlled hydrolysis and condensation or co-condensation.

TABLE 4

| Further starting materials V099 | |
|---|---|
| Compound | Initial mass |
| Water | 22.7 g |
| Ethanol | 174.8 g |
| Hydrochloric acid | 0.19 g |

Example 7

VTMO/PTMO-Siloxane Oligomer—V079

Procedure: A 2 l four-necked apparatus with water cooling and magnetic stirrer was charged with the two monomers, 370.58 g of vinyltrimethoxysilane and 514.20 g of propyltrimethoxysilane. Subsequently a mixture of 540.20 g of methanol, 1.02 g of hydrochloric acid (20%) and 80.28 g of DI water was metered in over 10 minutes at RT and ambient pressure, and an exothermic process was observed. The temperature rose to about 40° C. The batch was then heated to an oil bath temperature of 100° C. The total reaction time ran to 5 hours.

After the reaction time, the alcohol was distilled off under low pressure (<1 mbar) at an oil bath temperature of 100° C. This gave 596.30 g of siloxane oligomer.

The yields in Examples 1 to 7 were increasable to more than 99% through the process of the invention.

Comparative Example 1

V078—Example 1 from EP0518057
B1—Preparation of a Co-Condensate of Vinyltrimethoxysilane and Methyltrimethoxysilane with a Molar Vinyl:Methoxy Groups Ratio of Around 1:3

Procedure: A 2 l four-necked apparatus with water-operated condenser and magnetic stirrer was charged with 397.6 g of vinyltrimethoxysilane (VTMO) and 244.6 g of methyltrimethoxysilane at 20° C. The mixture was admixed, using a 500 ml dropping funnel, with a solution of 49.9 g of distilled water in 332.8 g of methanol, this solution containing 2400 ppm of hydrogen chloride. After a total of 16 hours, the entire methanol together with HCl was distilled off at about 300 mbar. Thereafter the resulting oligomer mixture was distilled to a pressure of about 1 mbar and a boiling range ending at 113° C. In this way, 170 g of clear product were obtained.

TABLE 5

| Raw materials V078 | | |
|---|---|---|
| Compound | Supplier | Initial mass |
| VTMO | Evonik Degussa GmbH | 397.6 g |
| MTMS | Evonik Degussa GmbH | 244.6 g |
| Hydrochloric acid 2400 ppm | Merck (HCl 37%) Double-distilled water | 49.9 g |
| Methanol | ROTH | 332.8 g |

Comparative Example 2

V081—Example 6 from EP 0518057
B1—Preparation of a Condensate of Vinyltrimethoxysilane with a Molar Vinyl: Methoxy Groups Ratio of about 1:1.75

Procedure: A 2 l four-necked apparatus with water-operated condenser and magnetic stirrer was charged with 693.83 g of VTMO at 20° C. The mixture was admixed with a solution of 52.82 g of distilled water in 351.53 g of methanol, the solution containing 1100 ppm of hydrogen chloride. A 500 ml dropping funnel was used for this purpose. The temperature rose to about 36° C. within 26 minutes. After a total of 13 hours, the entire methanol together with hydrochloric acid was removed by distillation under about 300 mbar over 2-3 hours. The resulting oligomer mixture was thereafter distilled down to a pressure of about 1 mbar and a boiling range ending at 100° C. In this way, 240 g of clear product were obtained.

TABLE 6

| Raw materials V081 | | |
|---|---|---|
| Compound | Supplier | Initial mass |
| VTMO | Evonik Degussa GmbH | 693.7 g |
| Methanol | | 351.5 g |
| Hydrochloric acid 1100 ppm | Merck (HCl 37%) Double-distilled water | 52.8 g |

Comparative Examples 3 to 5 in Analogy to Example 6, EP 0518057

The procedure disclosed in Example 6 was reproduced in each case for the compound VTMO and carried out for the compounds VTEO and VTMO, and also for the co-oligomers VTMO and propyltrimethoxysilane (PTMO) and for vinyltriethoxysilane (VTEO) with propyltriethoxysilane (PTEO), as new variants. The processes here were carried out with equimolar amounts in a 1000 g-scale batch size. A 2 l stirred apparatus was charged with each of the silanes at room temperature (vinyltrimethoxysilane (V074), vinyltriethoxysilane (V075), vinyltrimethoxy- and propyltrimethoxysilane (V076), and vinyltriethoxy- and propyltriethoxysilane (V077). The water/alcohol mixture (Examples V074, V076, methanol; Examples V075, V077=ethanol), containing 1100 ppm (0.11%) of hydrogen chloride in each case, was metered in. In each case an exothermic temperature profile was observed. The temperature here rose in each case to 35-40° C. After a reaction time of 13 hours, the alcohol was stripped off over 3 hours at an absolute pressure of 300 mbar. Finally the oligomer mixture itself was distilled off under a pressure of <0.1 mbar.

TABLE 7

| Starting materials and yield | | | | |
|---|---|---|---|---|
| | Experiment number | | | |
| | V074 | V075 | V076 | V077 |
| Remarks: Distillates | Example 6 | VTEO new variant Example 6 EP 0518057 | VTMO/ PTMO new variant of Example 6 EP 0518057 | VTEO/ PTEO new variant of Example 6 EP 0518057 |
| Silane A | VTMO 631.50 g | VTEO 614.46 g | VTMO 307.01 g | VTEO 301.35 g |
| Silane B | | | PTMO 340.35 g | PTEO 326.74 g |
| Catalyst (20% strength hydrochloric acid) | 2.02 g | 2.12 g | 1.86 g | 2.04 g |
| Alcohol | 320.02 g | 348.69 g | 305.24 g | 335.55 g |
| Water | 46.46 g | 34.74 g | 45.53 g | 34.32 g |
| Yield (%) via mol Si | 37.40 | 93.75 | 76.02 | 89.62 |

Analytical Results

TABLE 8

Analytical results Comparative Examples 3 to 5.

| | Experiment | | | | |
|---|---|---|---|---|---|
| | V081 | V074 | V075 | V076 | V077 |
| Viscosity 20° C. [mPa · s] | | 2.1 | 2.3 | 3 | 2.6 |
| TGA | | | | | |
| Weight decrease % | | 99.5%, n.r. | 98.3%, (1.1) | 99.5%, (1.2) | 98.2% (1.3) |
| DTG 1 (2) | | 176° C. and 196° C. | 196° C. | 222° C. | 209° C. |
| 5% mass loss at T= | 111° C. | 118° C. | 135° C. | 135° C. | 131° C. |
| 50% mass loss at T= | 164° C. | 162° C. | 197° C. | 203° C. | 202° C. |
| 95% mass loss at T= | | 209° C. | 235° C. | 243° C. | 238° C. |
| Mass loss [%] at 150° C. | 28 | 23 | 12 | 26 | 11 |
| Mass loss [%] at 200° C. | 99 | 86 | 59 | 49 | 50 | n.r.: no residue,
(1.1): individual black dots on crucible base;
(1.2) no residue apparent,
(1.3) black dots on crucible base and crucible base rim,
(2): DTG1: Temperature at max. rate of mass decrease [dm/dt] – first peak.

TABLE 9

Analytical results of the VTEO/PTEO siloxane oligomers

| | Experiment No. V097 | Experiment No. V098 | Experiment No. V099 |
|---|---|---|---|
| Total chloride [mg/kg] | 55 | 35 | 60 |
| Hydrol. chloride [mg/kg] | 8 | 5 | 4 |
| SiO$_2$ [% (mass)] | 39.1 | 41.4 | 38.6 |
| Free ethanol [% (mass)] | 0.5 | 0.5 | 0.6 |
| VTEO/PTEO [% (mass)] | 9 | 4.3 | 10.6 |
| Appearance | 1 | 1 | 0 |
| Colour number (mg Pt—Co/l) | <5 | <5 | <5 |
| Density at 20° C. [g/cm3] | 0.965 | 0.98 | 0.964 |
| Viscosity at 20° C. [mPa s] | 2.3 | 3.2 | 2.2 |
| Flash point (° C.) | 12 | 38 | 46 |
| Alcohol after hydrolysis (%, VOC) | 16 | 10 | 8.6 |

TABLE 10

Analytical results siloxane oligomers prepared in analogy to V087 to V089 and V079.

| | Description | | | |
|---|---|---|---|---|
| | VTMO/ PTMO oligomer | VTMO oligomer | VTEO oligomer | VTEO/ PTEO oligomer |
| Oligomer | liquid-phase product | liquid-phase product | liquid-phase product | liquid-phase product |
| Experiment number | V079 Example 7 | analogous to V087 Example 1 | analogous to V088 Example 2 | analogous to V089 Example 3 |
| Total chloride [mg/kg] | 55.00 | 75.00 | 140.00 | 45.00 |
| hydrol. chloride [mg/kg] | 8.00 | <3 | 16.00 | <3 |
| pH | 4.10 | 4.30 | 3.70 | 3.70 |
| free methanol [wt %] | <0.1 | <0.1 | — | — |
| free ethanol [wt %] | — | — | 0.10 | <0.1 |
| SiO$_2$ content [wt %] | 50.50 | 54.40 | 46.50 | 42.90 |
| Flash point [° C.] | 92.00 | 104.00 | 101.00 | 99.00 |
| Density 20° C. [g/mol] | 1.05 | 1.09 | 1.02 | 0.99 |

TABLE 10-continued

Analytical results siloxane oligomers prepared in analogy to V087 to V089 and V079.

| | Description | | | |
|---|---|---|---|---|
| | VTMO/ PTMO oligomer | VTMO oligomer | VTEO oligomer | VTEO/ PTEO oligomer |
| Viscosity 20° C. [mPa · s] | 5.60 | 5.10 | 3.70 | 4.40 |
| Refractive index [20° C.] | 1.42 | 1.43 | 1.42 | 1.42 |
| Alcohol after hydrolysis [% VOC] | 33.00 | 37.00 | 45.00 | 3.90 |

TABLE 11

Analytical results for V078 (Comparative Example 1).

| Experiment No. V078 | Total chlorides [mg/kg] | Hydrolysable chloride [mg/kg] | SiO$_2$ (mass) [%] | VTMO (mass) [%] | Colour number [mg Pt—Co/l] |
|---|---|---|---|---|---|
| Distillate (1) | 230 | 16 | 52.4 | <0.1 | <5 |

(1) cf. Example 1 in EP0518057B1.

TABLE 12

Analytical results for V081 (Comparative Example 2)

| Experiment No. V081 | Total chlorides [mg/kg] | Hydrolysable chloride, [mg/kg] | SiO$_2$ (mass) [%] | VTMO (mass) [%] | Colour number [mg Pt—Co/l] |
|---|---|---|---|---|---|
| Distillate (2) | 50 | <3 | 48.6 | 1.7 | <5 |

(2) (cf. Example 6 in EP0518057B1).

TABLE 13

Evaluation of GPC analysis results(2) analogous second batch

| Experiment number | Mn [g/mol] | Mw [g/mol] | D = Mw/Mn |
|---|---|---|---|
| V087 | 461.98 | 545.00 | 1.1797 |
| V087 (2) | 460.40 | 538.63 | 1.1699 |
| V088 | 457.84 | 513.50 | 1.1606 |
| V088 (2) | 416.18 | 466.50 | 1.1209 |
| V089 | 446.93 | 510.18 | 1.1415 |
| V097 | 369.51 | 419.02 | 1.134 |
| V098 | 418.20 | 456.81 | 1.0923 |
| V099 | 363.06 | 411.36 | 1.1330 |
| V078 | 275.13 | 291.11 | 1.0581 |
| V081 | 254.06 | 269.90 | 1.0624 |

The analyses show good reproducibility of the molar masses and of the molar mass distribution.

TABLE 14

Results from the $^{29}$Si NMR analyses of the siloxane oligomers of type VTEO, VTMO, VTEO/PTEO and VTEO/PTEO/TEOS, [VS = vinylsilyl, PS = propylsilyl, ES = ethoxysilyl]

Fractions in the siloxane oligomer compositions.

| Experiment No. | Silane monomer [mol %] | M structure [mol %] | D structure [mol %] | T structure [mol %] |
|---|---|---|---|---|
| V087 | 0.4 (VTMO) | 44.6 (VS) | 47.4 (VS) | 7.6 (VS) |
| V088 | 0.7 (VTEO) | 48.2 (VS) | 45.7 (VS) | 5.4 (VS) |

TABLE 14-continued

Results from the $^{29}$Si NMR analyses of the siloxane oligomers of type VTEO, VTMO, VTEO/PTEO and VTEO/PTEO/TEOS, [VS = vinylsilyl, PS = propylsilyl, ES = ethoxysilyl]

Fractions in the siloxane oligomer compositions.

| Experiment No. | Silane monomer [mol %] | M structure [mol %] | D structure [mol %] | T structure [mol %] |
|---|---|---|---|---|
| V089 | — | 29.1 (VS) | 20.4 (VS) | 1.7 (VS) |
|  | 0.5 (PTEO) | 32.5 (PS) | 15.3 (PS) | 0.5 (PS) |
| V097 | 1.4 (VTEO) | 38.1 (VS) | 11.2 (VS) | — |
|  | 5.3 (PTEO) | 36.8 (PS) | 7.3 (PS) | — |
| V098 | 0.6 (VTEO) | 34.1 (VS) | 15.3 (VS) | — |
|  | 2.5 (PTEO) | 36.1 (PS) | 11.4 (PS) | — |
| V099 | 1.9 (VTEO) | 35.2 (VS) | 9.8 (VS) | — |
|  | 6.3 (PTEO) | 34.7 (PS) | 8.1 (PS) | — |
|  | 0.5 (TEOS) | 2.7 (ES) | 0.8 (ES) | — |

TABLE 15

Results from the $^{29}$Si NMR analyses on the products from Comparative Experiments V078 and V081, [VS = vinylsilyl, MS = methylsilyl]

| Comparative Experiment No. | M structure [mol %] | D structure [mol %] | T structure [mol %] | Silane monomer [mol %] |
|---|---|---|---|---|
| V078 | 52.1 (VS) | 9.1 (VS) | - (VS) | 0.9 (VTMO) |
|  | 29.3 (MS) | 8.6 (MS) | - (MS) | - (MTMS) |
| V081 | 91.8 (VS) | 6.8 (VS) | - (VS) | 1.2 (VTMO) |

TABLE 16a

| Analyses | VTMO/PTMO (V079) |
|---|---|
| GPC | Liquid phase |
| Mn [g/mol] | 374.80 |
| Mw [g/mol] | 428.99 |
| D | 1.14 | see 16e

TABLE 16b

| Analyses Distribution: GPC | VTMO/PTMO (V079) MP [D] | Area [%] |
|---|---|---|
| Disiloxane | 214.65 | 8.44 |
| Trisiloxane | 320.66 | 35.64 |
| Tetrasiloxane | 420.89 | 27.29 |
| Pentasiloxane | 481.28 | 13.32 |
| > Pentasiloxane | 581.43 | 14.88 | see 16e, MP = molecule-weighted peak

TABLE 16c

| Analyses | VTMO/PTMO (V079) | |
|---|---|---|
| NMR: NMR 1H, 13C | Co-oligomer | |
| Silane: Alkoxy | 2.4 | |
| Alkyl: Vinyl | 0.83 | |
| Alkyl: Alcohol | 0.02 | |
| Vinyl:Alcohol | | |
| 29 Si Siloxane | 29 Si Silane A | 29 Si Silane B |
| Monomer content silane [%] | — | 0.20 |
| Additional signal | — | |
| M structure [%] | 16.70 | 25.70 |
| D structure [%] | 24.40 | 25.70 |
| T structure [%] | 3.90 | 2.20 | see 16e

TABLE 16d

| Other analyses: | VTMO/PTMO (V079) |
|---|---|
| Total chloride [mg/kg] | 55.00 |
| hydrol. chloride [mg/kg] | 8.00 |
| pH | 4.10 |
| free methanol [wt %] | <0.1 |
| free ethanol [wt %] | — |
| SiO2 content [wt %] | 50.50 |
| Colour number [mg Pt/Co/l] | <5 |
| Appearance | 1.00 |
| Flash point [° C.] | 92.00 |
| Density 20° C. [g/mol] | 1.05 |
| Viscosity 20° C. [mPa's] | 5.60 |
| Refractive index [20° C.] | 1.42 |
| Alcohol after hydrolysis [ % VOC] | 33.00 | see 16e

TABLE 16e

Analytical results V079, Example 7, (1): DTG1: Temperature at max. rate of mass decrease [dm/dt] - first peak.

| TGA | V079 |
|---|---|
| Weight decrease % | 96.0% |
| TG end: DTG 1 (1) | 235° C. |
| 5% mass loss at T = | 156° C. |
| 50% mass loss at T = | 232° C. |
| 95% mass loss at T = | 538° C. |
| Mass loss [%] at 150° C. | 4 |
| Mass loss [%] at 200° C. | 23 |

TABLE 17

Fractions of the siloxane oligomers and their proportion in the compositions in area %, GPC of further siloxane oligomers prepared by analogy to Examples 1 to 3 and 7, (1) analogous to Example 1, V087, (2) analogous to Example 2, V088, (3) analogous to Example 3, V089. The figures are proportions in area % obtained via GPC measurements. See explanation on page 71.

| Oligomer from silane | <disiloxane [%] | disiloxane, cyclotrisiloxane [%] | trisiloxane, cyclotetrasiloxane [%] | tetrasiloxane, cyclopentasiloxane [%] | pentasiloxane, cyclohexasiloxane [%] | >pentasiloxane, [%] |
|---|---|---|---|---|---|---|
| VTMO (1) | 0.28 | 9.73 | 24.34 | 25.37 | 16.83 | 23.45 |
| VTEO (2) | 0.25 | 19.73 | 39.39 | 18.94 | 9.49 | 12.20 |

TABLE 17-continued

Fractions of the siloxane oligomers and their proportion in the compositions in area %, GPC of further siloxane oligomers prepared by analogy to Examples 1 to 3 and 7, (1) analogous to Example 1, V087, (2) analogous to Example 2, V088, (3) analogous to Example 3, V089. The figures are proportions in area % obtained via GPC measurements. See explanation on page 71.

| Oligomer from silane | <disiloxane [%] | disiloxane, cyclotrisiloxane [%] | trisiloxane, cyclotetrasiloxane [%] | tetrasiloxane, cyclopentasiloxane [%] | pentasiloxane, cyclohexasiloxane [%] | >pentasiloxane, [%] |
|---|---|---|---|---|---|---|
| VTEO/PTEO (3) | 0.01 | 18.61 | 46.02 | 17.85 | 7.71 | 9.79 |
| VTMO/PTMO (V079) | 0.43 | 8.44 | 35.64 | 27.29 | 13.32 | 14.88 |

TABLE 18a

Mw, Mn and D of further siloxane oligomers prepared by analogy with Examples 1 to 3 and 7, (1) analogous to Example 1, V087, (2) analogous to Example 2, V088, (3) analogous to Example 3, V089.

| Oligomer from silane | Mw [g/mol] | Mn [g/mol] | D |
|---|---|---|---|
| VTMO (1) | 543.09 | 469.25 | 1.16 |
| VTEO (2) | 515.66 | 450.10 | 1.15 |
| VTEO/PTEO (3) | 514.59 | 464.13 | 1.11 |
| VTMO/PTMO (V079) | 374.80 | 428.99 | 1.14 |

TABLE 18b

Mw (rel.) of further siloxane oligomers prepared by analogy with Examples 1 to 3 and 7, (1) analogous to Example 1, V087, (2) analogous to Example 2, V088. The figures are proportions in area % obtained via GPC measurements. See explanation on page 71.

| Sample | 0-250 rel. MW [%] | 250-500 rel. MW [%] | 500-750 rel. MW [%] | 750-1000 rel. MW [%] | >1000 rel. MW [%] |
|---|---|---|---|---|---|
| VTMO (1) | 3.0 | 49.6 | 30.9 | 11.41 | 5.06 |
| VTEO (2) | 1.1 | 56.5 | 28.9 | 9.1 | 4.5 |
| VTEO/PTEO (V079) | 0.9 | 63.3 | 25.2 | 7.28 | 3.37 |

The analyses show that the compositions of the invention of olefinically functionalized siloxane oligomers with a disiloxanes and/or cyclotrisiloxanes content of less than or equal to 30% (area %, GPC), preferably less than or equal to 20%, exhibit particularly low mass losses of below 50 wt % even at high temperatures of greater than 210 to greater than 220° C. in the TGA. A particular advantage at the same time is their high flash point of greater than 80° C. or up to greater than 90° C. It has been found that, generally, compositions exhibit these advantageous properties when the proportions of siloxane oligomers therein are as follows: less than or equal to 30% of disiloxanes and/or cyclotrisiloxanes, and preferably greater than or equal to 20%, more preferably greater than or equal to 23% (area %, GPC) of linear, branched trisiloxanes and/or cyclotetrasiloxanes, and in particular greater than or equal to 10%, in particular greater than 14% (area %, GPC) of linear, branched tetrasiloxanes and/or cyclopentasiloxanes and preferably higher molecular mass fractions present as far as possible only in small amounts. High molecular mass oligomers result in poorer dispersibility in practical application in the plastics used, particularly during the extruder run time, since they cannot be dispersed uniformly with sufficient speed. Further preference, therefore, is given to the compositions having olefinically functionalized siloxane oligomers in which the proportion of linear or branched pentasiloxanes and/or cyclohexasiloxanes is between 7% to 40% (area %, GPC). With particular preference the compositions have a particularly low fraction of siloxane oligomers, such as linear, branched hexasiloxanes, cycloheptasiloxanes and higher siloxanes, of less than 30%, more preferably of less than 25%. In view of the stated requirements that on the one hand the flash point is to be very high and also that the mass losses in the temperature range between 150 to 200° C., preferably also between 200 to 220° C., are to be particularly low, and at the same time an effective and rapid dispersibility in the products must be achieved, there is generally a necessity for a highly balanced and narrowly defined ratio of molecular weights in the compositions of the olefinically functionalized siloxane oligomers, in order to meet the required technical specifications. As demonstrated above by the analytical details, the compositions, all of which are prepared by the process of the invention, meet the stated requirements in terms of purity, low total chloride content, and, moreover, have high flash points of more than 90° C., in conjunction with effective dispersibility in polymers, prepolymers or mixtures thereof optionally together with monomers. The disclosure above is not limited to the specific examples, but instead applies in respect of all compositions and processes according to the invention. In view of the low mass losses at up to 220° C., it has been possible to achieve a further lowering in the VOC content during high-temperature conversion, such as in extruders, for example. As demonstrated below in the use examples, it has also been possible to achieve a further reduction in the water absorption of the cable compounds produced using the siloxane oligomers of the invention.

TABLE 19

TGA of further siloxane oligomers prepared in analogy to Inventive Examples 1 to 3 and 7 [(1) analogous to Example 1, V087, (2) analogous to Example 2, V088, (3) analogous to Example 3, V089]

| Remarks: liquid-phase product in each case | VTMO oligomer (1) | VTEO oligomer (2) | VTMO-PTMO oligomer (Ex.7, V079) | VTEO-PTEO oligomer (3) |
|---|---|---|---|---|
| 5% mass loss at T = | 146° C. | 149° C. | 156° C. | 156° C. |
| 50% mass loss at T = | 232° C. | 228° C. | 232° C. | 242° C. |
| Mass loss [%] at 150° C. | 7 | 6 | 4 | 3 |
| Mass loss [%] at 200° C. | 28 | 29 | 23 | 23 |

Note:
Typical processing temperatures in the plastic and rubber region lie between 150 and 200° C.

Kneading Operations

TABLE 20

Overview of ingredients used for kneading study.

| Type of compound | Designation |
|---|---|
| Polymer | EVA (ethylene-vinyl acetate) |
| Filler | ATH (aluminium trihydroxide) |
| Stabilizer | Irganox 1010 |
| Peroxide | Dicumyl peroxide (DCUP) |

Preparation of measurement specimens: From the samples produced, following storage in a climatically controlled compartment at 23° C. and 50% relative humidity, specimens were made for the tensile experiments and for the determination of the water uptake capacity and melt index.

TABLE 21

Peroxide mixtures for kneadings

| Silane/DCUP solution. Batch | Initial mass of DCUP | Initial mass of silane | For Experiment No. |
|---|---|---|---|
| V078 | 9.81 g | 0.19 g | V116 |
| V081 | 9.81 g | 0.19 g | V118 |
| Silane/siloxane | | VTMO-siloxane | |
| V087 | 4.91 g | 0.09 g | V150 |

Kneading study: The following kneading operations were processed with a temperature profile of "3 min at 140° C., from 140° C. to 170° C. in 2 min, 5 min at 170° C." at a rotary speed of 30 rpm in a HAAKE kneading apparatus. Subsequently, each batch was processed by compression to form two plates at 165° C. under a load pressure of 20 t.

TABLE 22

Initial masses in the kneading study

| Experiment No. | Initial mass EVA | Initial mass ATH | Initial mass DCUP/silane solution | Silane/DCUP solution Batch | Remarks |
|---|---|---|---|---|---|
| V150 | 27.72 g | 41.61 g | 0.43 g | V087 | |
| V116 | | | 0.45 g | V078 | Examples |
| V118 | | | 0.44 g | V081 | |
| V153 | | | — | — | Blank value |

Performance tests: From the samples produced, after storage in a climatically controlled compartment at 23° C. and 50% relative humidity, specimens were made for the determination of the water uptake capacity.

TABLE 23

Results of water uptake capacity

| Info | Experiment number | Value [mg/cm2] 7 d storage |
|---|---|---|
| No silane | V153 | 3.81 |
| V078 | V116 | 1.55 |
| V081 | V118 | 1.40 |
| VTMO-siloxane, V087 | V150 | 1.22 |

In cable compounds, the compositions of the invention exhibit lower water uptake than do known systems.

The invention claimed is:

1. A composition, comprising an olefinically functionalized siloxane oligomer having not more than one olefinic radical on a silicon atom thereof, wherein
the olefinically functionalized siloxane oligomer has a Si—O-crosslinked structural element which forms catenary, cyclic, crosslinked or optionally three-dimensionally crosslinked structures, with a structure of formula I,

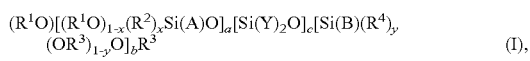

$(R^1O)[(R^1O)_{1-x}(R^2)_xSi(A)O]_a[Si(Y)_2O]_c[Si(B)(R^4)_y(OR^3)_{1-y}O]_bR^3$ (I), the structural elements are derived from alkoxysilanes,
wherein A is an olefinic radical selected from a linear, branched or cyclic alkenyl- or cycloalkenyl-alkylene-functional group having in each case 2 to 16 C atoms, and
B is a saturated hydrocarbon radical selected from a linear, branched or cyclic alkyl radical having 1 to 16 C atoms,
Y is $OR^3$ or, in crosslinked and optionally three-dimensionally crosslinked structures, independently at each occurrence, $OR^3$ or $O_{1/2}$, where
$R^1$ independently at each occurrence is a linear, branched or cyclic alkyl radical having 1 to 4 C atoms or H,
$R^2$ independently at each occurrence is a linear, branched or cyclic alkyl radical having 1 to 15 C atoms,
$R^3$ independently at each occurrence is a linear, branched or cyclic alkyl radical having 1 to 4 C atoms or H, and
$R^4$ independently at each occurrence is a linear, branched or cyclic alkyl radical having 1 to 15 C atoms,
a, b, c, x and y are each independently an integer, wherein 1≤a, 0≤b, 0≤c, x independently at each occurrence is 0 or 1, y independently at each occurrence is 0 or 1, and (a+b+c)≥2,
the structural elements $[(R^1O)_{1-x}(R^2)_xSi(A)O]_a$, $[Si(B)(R^4)_y(OR^3)_{1-y}O]_b$ and $[Si(Y)_2O]_c$, in relation to all silicon atoms of formula I, are present in less than or equal to 80% and greater than or equal to 30% as M structure,
a weight-average molecular weight (Mw) is greater than or equal to 315 g/mol, and
an amount of residues of the acid catalyst during preparation is less than or equal to 250 mg/kg of composition, wherein
a weight-average molecular weight (Mw) is greater than 315 g/mol
a number-average molecular weight (Mn) is greater than 300 g/mol, and a polydispersity (D), as a ratio of Mw/Mn, is from 1.05 to 1.25.

2. The composition according to claim 1, wherein
the siloxane oligomer has derived structural elements from at least one alkoxysilane selected from:
(i) olefinically functionalized alkoxysilanes of formula II,

A-Si(R2)x(OR1)3-x (II)

wherein A is an olefinic radical selected from a linear, branched or cyclic alkenyl- or cycloalkenyl-alkylene-functional group having in each case 2 to 16 C atoms, where $R^2$ independently at each occurrence is a linear, branched or cyclic alkyl radical having 1 to 15 C atoms and x is 0 or 1, and $R^1$ independently at each occurrence is a methyl, ethyl or propyl group, and optionally
(ii) alkoxysilane of formula III, functionalized with a saturated hydrocarbon radical,

B—Si(R^4)_y(OR^3)_{3-y} (III)

wherein B is an unsubstituted hydrocarbon radical selected from a linear, branched or cyclic alkyl radical having 1 to 16 C atoms, where $R^4$ independently at each occurrence is a linear, branched or cyclic alkyl radical having 1 to 15 C atoms and y is 0 or 1, and $R^3$ independently at each occurrence is a methyl, ethyl or propyl group, and optionally (iii) a tetraalkoxysilane of formula IV which is $Si(OR^3)_4$, wherein $R^3$ independently at each occurrence is as defined above.

3. The composition according to claim 2, wherein in the olefinically functionalized alkoxysilanes of formula II, x is 0, and optionally in the alkoxysilane of formula III functionalized with a saturated hydrocarbon radical, y is 0.

4. The composition according to claim 3, wherein the amount of residues of the acid catalyst in the preparation, in terms of chlorine, chloride or total chloride, is less than or equal to 250 mg/kg of the composition.

5. The composition according to claim 1, wherein, selected in each case independently of one another (i) the structural element $[(R^1O)_{1-x}(R^2)_xSi(A)O]_a$ in formula I is present, in relation to all silicon atoms of formula I, at 0.0% to 8.0% as T structure, (ii) the structural elements $[(R^1O)_{1-x}(R^2)_xSi(A)O]_a$ and $[Si(B)(R^4)_y(OR^3)_{1-y}O]_b$ and $[Si(Y)_2O]_c$ in formula I are present together, in relation to all silicon atoms of formula I, at less than or equal to 75% to 40% as D structure, (iii) the structural element $[(R^1O)_{1-x}(R^2)_xSi(A)O]_a$ in formula I is present, in relation to all silicon atoms of formula I, at 25% to 55% as M structure, (iv) the structural element $[Si(B)(R^4)_y(OR^3)_{1-y}O]_b$ in formula I, is present, in relation to all silicon atoms of formula I, at less than or equal to 40% as M structure, (v) the structural element $[Si(Y)_2O]_c$ in formula I is present at greater than 20% as D structure, and (vi) the structural element $[Si(Y)_2O]_e$ in formula I is present at 0.0% to 1% as T structure.

6. The composition according to claim 1, wherein a weight-average molecular weight (Mw) is from greater than or equal to 350 g/mol to 800 g/mol.

7. The composition according to claim 6, wherein the weight-average molecular weight (Mw) is from greater than or equal to 350 g/mol to 750 g/mol.

8. The composition according to claim 2, wherein in formulae I, II, or both, the olefinic radical A, independently at each occurrence, is selected from a vinyl, allyl, butenyl, 3-butenyl, pentenyl, hexenyl, ethylhexenyl, heptenyl, octenyl, cyclohexenyl-C1 to C8-alkylene-cyclohexenyl-2-ethylene, 3'-cyclohexenyl-2-ethylene, cyclohexadienyl-C1 to C8-alkylene or cyclohexadienyl-2-ethylene group, and independently thereof in formulae I, III, or both, the unsubstituted hydrocarbon radical B, independently at each occurrence, is selected from a methyl, ethyl, propyl, isobutyl, octyl or hexadecyl group, and independently at each occurrence, $R^1$ is a methyl, ethyl or propyl group and $R^3$ independently is a methyl, ethyl or propyl group.

9. The composition according to claim 2, wherein in formulae I, II, or both, the olefinic radical A is a vinyl group, and independently thereof in formulae I, III, or both, the unsubstituted hydrocarbon radical B is selected from a methyl, ethyl, propyl, butyl, isobutyl, n-butyl, tert-butyl, pentyl, n-pentyl, isopentyl, neopentyl, hexyl, isohexyl, neohexyl, heptyl, 2,2-dimethylbutyl, 2,3-dimethylbutyl, 2-methylpentyl, 3-methylpentyl, octyl, n-octyl, isooctyl, nonyl, decyl, undecyl, dodecyl, $C_{13}H_{27}$—, $C_{14}H_{29}$—, $C_{15}H_{31}$— and hexadecyl group, and independently at each occurrence, $R^1$ is a methyl, ethyl or propyl group and $R^3$ independently is a methyl, ethyl or propyl group.

10. The composition according to claim 1, wherein the olefinically functionalized siloxane oligomer is present at greater than or equal to 90% (area %) in relation to the overall composition, with a molecular weight of less than or equal to 1000 g/mol in the composition.

11. The composition according to claim 1, wherein c in formula I is 0.

12. The composition according to claim 1, wherein a weight-average molecular weight (Mw) is greater than or equal to 420 g/mol, a number-average molecular weight (Mn) is greater than or equal to 400 g/mol, and a polydispersity (D), as a ratio of Mw/Mn, is from 1.05 to 1.25.

13. The composition according to claim 1, wherein a weight-average molecular weight (Mw) is greater than 450 g/mol to 590 g/mol, a number-average molecular weight (Mn) is greater than 410 g/mol to 510 g/mol, and a polydispersity (D), as a ratio of Mw/Mn, is from 1.05 to 1.25.

14. The composition according to claim 1, wherein the olefinically functionalized siloxane oligomer is present at greater than or equal to 45% (area %, GPC) as trisiloxane, tetrasiloxane, cyclotetrasiloxane and/or cyclopentasiloxane in the composition.

15. The composition according to claim 1, wherein the composition suffers a loss of mass of 50 wt %, determined by thermogravimetric analysis, at a temperature above 210° C.

16. The composition according to claim 15, wherein the loss of mass by the composition as determined by TGA (platinum crucible, lid with hole, 10 K/min) at a temperature up to and including 140° C. is less than 5 wt %.

17. The composition according to claim 1, wherein a ratio of M to D structures in the siloxane oligomer or in formula I, in relation to all silicon atoms, is from 1:2 to 10:1.

18. The composition according to claim 2, wherein a) the siloxane oligomer and a structure of formula I, in each case derived from alkoxysilanes of formula II as olefinic radical A, have a vinyl group, where $R^1$ independently at each occurrence is a methyl or ethyl group, b) the siloxane oligomer and a structure of formula I, in each case derived from alkoxysilanes of formula II as olefinic radical A, have a vinyl group and, derived from alkoxysilanes of formula III as unsubstituted hydrocarbon radical B, have a propyl group, where $R^1$ and $R^3$ independently at each occurrence is a methyl or ethyl group, or c) the siloxane oligomer and a structure of formula I, in each case derived from alkoxysilanes of formula II and formula IV and optionally of formula III, are selected from a) or b), where $R^3$, derived from formula IV, independently at each occurrence is a methyl or ethyl group.

19. The composition according to claim 2, wherein in each case independently, the siloxane oligomer is derived from an olefinically functionalized alkoxysilane of general formula II which is selected from vinyltriethoxysilane and vinyltrimethoxysilane, and optionally from an alkoxysilane of formula III, the alkoxysilane of the formula III, independently at each occurrence, being selected from the group consisting of methyltriethoxysilane, methyltrimethoxysilane, ethyltriethoxysilane, ethyltrimethoxysilane, propyltriethoxysilane, propyltrimethoxysilane, butyltriethoxysilane, butyltrimethoxysilane, n-butyltriethoxysilane, n-butyltrimethoxysilane, isobutyltriethoxysilane, isobutyltrimethoxysilane, hexyltriethoxysilane, hexyltrimethoxysilane, n-hexyltriethoxysilane, n-hexyltrimethoxysilane, isohexyltriethoxysilane, isohexyltrimethoxysilane, octyltriethoxysilane, octyltrimethoxysilane, n-octyltriethoxysilane, n-octyltrimethoxysilane, isooctyltriethoxysilane, isooctyltrimethoxysilane, undecyltriethoxysilane, undecyltrimethoxysilane, decyltriethoxysilane, decyltrimethoxysilane, nonadecyltriethoxysilane, nonadecyltrimethoxysilane, dodecyltriethoxysilane, dodecyltrimethoxysilane, $C_{13}H_{27}$-triethoxysilane, $C_{13}H_{27}$-trimethoxysilane, $C_{14}H_{29}$-triethoxysilane, $C_{14}H_{29}$-trimethoxysilane, $C_{15}H_{31}$-trimethoxysilane, $C_{15}H_{31}$-triethoxysilane, hexadecyltriethoxysilane and hexadecyltrimethoxysilane, and a transesterification product thereof.

20. A process for preparing a composition according to claim 1, comprising olefinically functionalized siloxane oligomers, the process comprising reacting at least an olefinically functionalized alkoxysilane of formula II,

where in formula II A is an olefinic radical selected from a linear, branched or cyclic alkenyl- or cycloalkenyl-alkylene-functional group having in each case 2 to 16 C atoms, $R^2$ is independently a linear, branched or cyclic alkyl radical having 1 to 15 C atoms and x is 0 or 1 and $R^1$ is independently a linear, branched or cyclic alkyl radical having 1 to 4 C atoms, in the presence of an acidic hydrolysis catalyst, condensation catalyst, or both, with water in a defined molar ratio of water to alkoxysilane alkoxy groups of from 1:2.75 to 1:5.0, in the presence of a solvent, to obtain the siloxane oligomer;

separating off the hydrolysis alcohol and the solvent present substantially; and obtaining the composition comprising olefinically functionalized siloxane oligomer as a liquid-phase product.

21. The process according to claim 20, wherein an olefinically functionalized alkoxysilane of general formula II is reacted in the presence of an acidic hydrolysis catalyst, condensation catalyst, or both, with an alkoxysilane of formula III,

wherein B is a saturated hydrocarbon radical selected from a linear, branched or cyclic alkyl radical having 1 to 16 C atoms, $R^3$ independently at each occurrence is a linear, branched or cyclic alkyl radical having 1 to 4 C atoms, $R^4$ is a linear, branched or cyclic alkyl radical having 1 to 15 C atoms, and y is 0 or 1.

22. The process according to claim 21, wherein an olefinically functionalized alkoxysilane of general formula II, and optionally an alkoxysilane of formula III, are reacted in the presence of an acidic hydrolysis catalyst, a condensation catalyst, or both, with a tetraalkoxysilane of formula IV,

wherein $R^3$ independently at each occurrence is a linear, branched or cyclic alkyl radical having 1 to 4 C atoms.

23. The process according to claim 20, wherein the reaction takes place in the presence of an alcohol as solvent.

24. The process according to claim 21, wherein the alkoxysilane of formula II and optionally the alkoxysilane of formula III are reacted with water in a defined molar ratio of water to alkoxysilane alkoxy groups of from 1:3 to 1:4.5 to obtain siloxane oligomers.

25. The process according to claim 21, wherein in the olefinically functionalized alkoxysilane of formula II,

A is selected from a vinyl, allyl, butenyl, pentenyl, hexenyl, ethylhexyl, heptenyl, octenyl, cyclohexenyl-C1 to C8-alkylene, cyclohexenyl-2-ethylene, 3'-cyclohexenyl-2-ethylene and cyclohexadienyl-C1 to C8-alkylene group, and $R^1$ independently is a methyl, ethyl or propyl group and x is 0 or 1, and independently in the alkoxysilane of formula III,

the unsubstituted hydrocarbon radical B is selected from a methyl, ethyl, propyl, butyl, isobutyl, octyl, butyl, n-butyl, tert-butyl, pentyl, n-pentyl, isopentyl, neopentyl, hexyl, isohexyl, neohexyl, 2,2-dimethylbutyl, 2,3-dimethylbutyl, 2-methylpentyl, 3-methylpentyl, heptyl, n-heptyl, octyl, isooctyl, nonyl, decyl, undecyl, dodecyl, $C_{13}H_{27}$, $C_{14}H_{29}$, $C_{15}H_{31}$ and hexadecyl group, and $R^3$ is a methyl, ethyl or propyl group and y is 0 or 1.

26. The process according to claim 21, wherein in the olefinically functionalized alkoxysilane of formula II, x is 0, and/or in the alkoxysilane of formula III functionalized with a saturated hydrocarbon radical, y is 0.

27. The process according to claim 26, wherein in each case independently the olefinically functionalized alkoxysilane of the general formula II is selected from the group consisting of vinyltriethoxysilane, allyltriethoxysilane, butenyltriethoxysilane, pentenyltriethoxysilane, hexenyltriethoxysilane, ethylhexenyltriethoxysilane, heptenyltriethoxysilane, octenyltriethoxysilane, cyclohexenyl-C1 to C8-alkylenetriethoxysilane, cyclohexenyl-2-ethylenetriethoxysilane, 3'-cyclohexenyl-2-ethylenetriethoxysilane, cyclohexadienyl-C1 to C8-alkylenetriethoxysilane or cyclohexadienyl-2-ethylenetriethoxysilane, vinyltrimethoxysilane, allyltrimethoxysilane, butenyltrimethoxysilane, pentenyltrimethoxysilane, hexenyltrimethoxysilane, ethylhexenyltrimethoxysilane, heptenyltrimethoxysilane, octenyltrimethoxysilane, cyclohexenyl-C1 to C8-alkylenetrimethoxysilane, cyclohexenyl-2-ethylenetrimethoxysilane, 3'-cyclohexenyl-2-ethylenetrimethoxysilane, cyclohexadienyl-C1 to C8-alkylenetrimethoxysilane and cyclohexadienyl-2-ethylenetrimethoxysilane, and in each case independently the alkoxysilane of formula III is selected from the group consisting of methyltriethoxysilane, ethyltriethoxysilane, n-propyltriethoxysilane, isopropyltriethoxysilane, butyltriethoxysilane, n-butyltriethoxysilane, isobutyltriethoxysilane, hexyltriethoxysilane, n-hexyltriethoxysilane, isohexyltriethoxysilane, heptyltriethoxysilane, octyltriethoxysilane, n-octyltriethoxysilane, isooctyltriethoxysilane, undecyltriethoxysilane, decyltriethoxysilane, nonadecyltriethoxysilane, dodecyltriethoxysilane, $C_{13}H_{27}$-triethoxysilane, $C_{14}H_{29}$-triethoxysilane or $C_{15}H_{31}$-triethoxysilane, hexadecyltriethoxysilane, methyltrimethoxysilane, ethyltrimethoxysilane, n-propyltrimethoxysilane, isopropyltrimethoxysilane, butyltrimethoxysilane, n-butyltrimethoxysilane, isobutyltrimethoxysilane, hexyltrimethoxysilane, n-hexyltrimethoxysilane, isohexyltrimethoxysilane, heptyltrimethoxysilane, octyltrimethoxysilane, n-octyltrimethoxysilane, isooctyltrimethoxysilane, undecyltrimethoxysilane, decyltrimethoxysilane, nonadecyltrimethoxysilane, dodecyltrimethoxysilane, $C_{13}H_{27}$-trimethoxysilane, $C_{14}H_{29}$-trimethoxysilane or $C_{15}H_{31}$-trimethoxysilane and hexadecyltrimethoxysilane, and in each case independently the alkoxysilane of formula IV is selected from the group consisting of tetraethoxysilane and tetramethoxysilane.

28. The process according to claim 20,
wherein
a vinyltrimethoxysilane or a vinyltriethoxysilane is reacted.

29. The process according to claim 22,
wherein
the alkoxysilanes of at least one of formulae II, III and IV are subjected to at least partial hydrolysis and condensation in the presence of the acidic hydrogen chloride catalyst.

30. The process according to claim 20,
wherein
a total chloride content of less than or equal to 250 mg/kg is set.

31. The process according to claim 20,
wherein
a total number of silicon atoms in the siloxane oligomer are present at less than or equal to 80% to greater than or equal to 35% as M structure, for a weight-average molecular weight (Mw) of greater than or equal to 315 g/mol.

32. The process according to claim 22,
wherein
vinyltrimethoxysilane is the alkoxysilane of formula II,
vinyltriethoxysilane is the alkoxysilane of formula II,
as alkoxysilanes of formulae II and III, vinyltrimethoxysilane and propyltrimethoxysilane, vinyltriethoxysilane and propyltriethoxysilane, vinyltriethoxysilane and propyltrimethoxysilane or vinyltrimethoxysilane and propyltriethoxysilane are used, or in a), b) or c) the alkoxysilanes with corresponding mixed methoxy- and ethoxy-functionalization are used
or
d) additionally in a), b) or c), as alkoxysilane of formula IV, a tetraethoxysilane, tetramethoxysilane or a mixture thereof is used.

33. The process according to claim 22, comprising:
initially introducing an (i) olefinically functionalized alkoxysilane of formula II or an olefinic functionalized alkoxysilane of formula I and an alkoxysilane of formula III and in each case optionally an alkoxysilane of formula IV; and then
adding a mixture comprising solvent, water, and HCl as acidic hydrolysis catalyst, condensation catalyst, or both, the solvent being the alcohol corresponding to the hydrolysis alcohol, and setting a defined molar ratio of water to alkoxysilane alkoxy groups of from 1:2.75 to 5.0, with the alcohol in an amount by weight of from 0.2 to 8 times in relation to a weight of the alkoxysilanes of formulae II, III and optionally IV.

34. The process according to claim 33, wherein the alcohol is present in an amount by weight of from 0.2 to 1.5 times in relation to the weight of the silanes of formulae II, III and optionally IV.

* * * * *